(12) United States Patent
Gao et al.

(10) Patent No.: US 11,623,206 B2
(45) Date of Patent: Apr. 11, 2023

(54) MANGANESE-COBALT SPINEL OXIDE NANOWIRE ARRAYS

(71) Applicant: University of Connecticut, Farmington, CT (US)

(72) Inventors: Pu-Xian Gao, Coventry, CT (US); Wenxiang Tang, Vernon, CT (US)

(73) Assignee: University of Connecticut, Farmington, CT (US)

( * ) Notice: Subject to any disclaimer, the term of this patent is extended or adjusted under 35 U.S.C. 154(b) by 728 days.

(21) Appl. No.: 16/465,948

(22) PCT Filed: Jun. 1, 2018

(86) PCT No.: PCT/US2018/035685
§ 371 (c)(1),
(2) Date: May 31, 2019

(87) PCT Pub. No.: WO2018/223054
PCT Pub. Date: Dec. 6, 2018

(65) Prior Publication Data
US 2020/0061591 A1    Feb. 27, 2020

Related U.S. Application Data

(60) Provisional application No. 62/513,544, filed on Jun. 1, 2017.

(51) Int. Cl.
*B01J 23/889*    (2006.01)
*B01D 53/86*    (2006.01)
(Continued)

(52) U.S. Cl.
CPC ........ *B01J 23/8892* (2013.01); *B01D 53/864* (2013.01); *B01J 23/005* (2013.01);
(Continued)

(58) Field of Classification Search
CPC ...... B01J 23/8892; B01J 23/005; B01J 23/78; B01J 35/0013; B01J 35/04; B01J 37/0215; B01D 53/864; C01G 51/40
See application file for complete search history.

(56) References Cited

U.S. PATENT DOCUMENTS

| 4,795,616 A | 1/1989 | Mondt et al. |
| 7,115,305 B2 | 10/2006 | Bronikowski et al. |

(Continued)

FOREIGN PATENT DOCUMENTS

| CN | 101456580 B | 1/2009 |
| CN | 102417201 A | 4/2012 |

(Continued)

OTHER PUBLICATIONS

International Preliminary Report on Patentability for Int'l Appl. No. PCT/US2018/035685, titled: Manganese-Cobalt Spinel Oxide Nanowire Arrays, dated Dec. 12, 2019.

(Continued)

*Primary Examiner* — James A Fiorito
(74) *Attorney, Agent, or Firm* — Ballard Spahr LLP

(57) ABSTRACT

Manganese-cobalt (Mn—Co) spinel oxide nanowire arrays are synthesized at low pressure and low temperature by a hydrothermal method. The method can include contacting a substrate with a solvent, such as water, that includes $MnO_4^-$ and $Co^{2+}$ ions at a temperature from about 60° C. to about 120° C. The method preferably includes dissolving potassium permanganate ($KMnO_4$) in the solvent to yield the $MnO_4^-$ ions. the substrate is The nanoarrays are useful for reducing a concentration of an impurity, such as a hydrocarbon, in a gas, such as an emission source. The resulting material with high surface area and high materials utilization efficiency can be directly used for environment and energy (Continued)

applications including emission control systems, air/water purifying systems and lithium-ion batteries.

9 Claims, 20 Drawing Sheets

(51) Int. Cl.
| | |
|---|---|
| B01J 23/00 | (2006.01) |
| B01J 23/78 | (2006.01) |
| B01J 35/00 | (2006.01) |
| B01J 35/04 | (2006.01) |
| B01J 37/02 | (2006.01) |
| C01G 51/00 | (2006.01) |

(52) U.S. Cl.
CPC ........... *B01J 23/78* (2013.01); *B01J 35/0013* (2013.01); *B01J 35/04* (2013.01); *B01J 37/0215* (2013.01); *C01G 51/40* (2013.01); *B01D 2255/2073* (2013.01); *B01D 2255/20746* (2013.01); *B01D 2255/405* (2013.01); *B01D 2255/9202* (2013.01); *B01D 2255/9205* (2013.01); *B01D 2255/9207* (2013.01); *C01P 2002/32* (2013.01)

(56) References Cited

U.S. PATENT DOCUMENTS

| | | |
|---|---|---|
| 8,704,210 B2 | 4/2014 | Gao |
| 8,835,285 B2 | 9/2014 | Grimes et al. |
| 9,855,549 B2 | 1/2018 | Gao et al. |
| 2004/0175844 A1 | 9/2004 | Yang et al. |
| 2005/0019799 A1 | 1/2005 | Grasso et al. |
| 2005/0223969 A1 | 10/2005 | Chen et al. |
| 2006/0270229 A1 | 11/2006 | Corderman et al. |
| 2007/0273264 A1 | 11/2007 | Choi et al. |
| 2007/0275499 A1 | 11/2007 | Corderman et al. |
| 2009/0242416 A1 | 10/2009 | Yun et al. |
| 2010/0180950 A1 | 7/2010 | Gao et al. |
| 2010/0230286 A1 | 9/2010 | Lifchits |
| 2013/0034472 A1 | 2/2013 | Cantrell et al. |
| 2013/0175499 A1 | 7/2013 | Gao |
| 2014/0256534 A1 | 9/2014 | Gao et al. |
| 2015/0258531 A1 | 9/2015 | Gao et al. |
| 2019/0314790 A1 | 10/2019 | Gao et al. |
| 2020/0030774 A1 | 1/2020 | Gao et al. |

FOREIGN PATENT DOCUMENTS

| | | |
|---|---|---|
| EP | 1 015 384 B1 | 7/2005 |
| KR | 10-2007-0113763 A | 11/2007 |
| WO | WO 2006/138071 A1 | 12/2006 |
| WO | WO 2012/052624 A1 | 4/2012 |
| WO | WO 2013/049606 A2 | 4/2013 |
| WO | WO 2014/043514 A1 | 3/2014 |
| WO | WO 2018/223054 A1 | 12/2018 |
| WO | WO 2018/223099 A1 | 12/2018 |
| WO | WO 2018/226543 A1 | 12/2018 |

OTHER PUBLICATIONS

International Search Report and Written Opinion for Int'l Appl. No. PCT/US2018/035685, titled: Manganese-Cobalt Spinel Oxide Nanowire Arrays, dated Aug. 29, 2018.
Andonova, S.M., et al., "Fine-Tuning the Dispersion and the Mobility of BaO Domains on $NO_x$ Storage Materials via $TiO_2$ Anchoring Sites," *J. Phys. Chem.*, 114: 17003-17016 (2010).
Banerjee, "Reduction kinetics of porous zinc oxide pellet with $CO$—$N_2$ gas mixture," *Mineral Processing and Extractive Metallurgy: Transactions of the Institution of Mining and Metallurgy*, Section C, vol. 117, No. 4, pp. 221-230 (Dec. 2008).
Buonsanti, R., et al., "Nonhydrolytic Synthesis of High-Quality Anisotropically Shaped Brookite $TiO_2$ Nanocrystals," *J. Am. Chem. Soc.*, 130: 11223-11233 (2008).
Chen, C.A. et al., "Growth and characterization of well-aligned densely-packed rutile $TiO_2$ nanocrystals on sapphire substrates via metal-organic chemical vapor deposition," *Nanotechnology*, 19: 075611, 6 pages (2008).
Chen, S.Y., et al., "Formation of Core/Shell-Type $ZnO/CeO_2$ Nanorods and $CeO_2$ Nanotube Arrays by Aqueous Synthesis and Wet-Etching," *Advanced Science Letters*, 1: 123-127 (2008).
Chung, et al., "Structural and optical properties of Be-doped ZnO nanocrystalline films by pulsed laser deposition," *Thin solid films*, 516: 4190-4193 (2007).
Desprcs, J., et al., "Storage of $NO_2$ on $BaO/TiO_2$ and the influence of NO," *Applied Catalysis B: Environmental*, 43: 389-395 (2003).
Du, S., et al., "Cu-Decorated ZnO Nanorod Array Integrated Structured Catalysts for Low-Pressure $CO_2$ Hydrogenation to Methanol," *Advanced Materials Interfaces*, 5, 11 pages (2018).
Feng, X., et al., "Vertically Aligned Single Crystal $TiO_2$ Nanowire Arrays Grown Directly on Transparent Conducting Oxide Coated Glass: Synthesis Details and Applications." *Nano Letters*, 8(11): 3781-3786 (2008).
Feng, Y., et al., "Hydrothermal synthesis and automotive exhaust catalytic performance of $CeO_2$ nanotube arrays," *J. of Materials Chemistry*, 21(39): 15442-15448 (Sep. 6, 2011).
Fierro, G., et al., "A Study of Anomalous Temperature-Programmed Reduction Profiles of $Cu_2O$, CuO, and CuO—ZnO Catalysts," *Journal of Catalysis*, 148: 709-721 (1994).
Gao, P.X., et al., "Nanowire Piezoelectric Nanogenerators on Plastic Substrates as Flexible Power Sources for Nanodevices," *Adv. Mater.*, 19: 67-72 (2007).
Gayen, R. et al., "Zinc magnesium oxide nanofibers on glass substrate by solution growth technique," *Journal of Crystal Growth*, 310: 4073-4080 (2008).
Guo, Y., et al., "Ultrahigh Surface Area Titanium Dioxide Nanorod Arrays Rooted on Monoliths." Poster presentation at $22^{nd}$ North American Catalysis Society Meeting, Detroit, Michigan (Jun. 5-10, 2011).
Guo, Y., et al., "Single crystalline brookite titanium dioxide nanorod arrays rooted on ceramic monoliths: A hybrid nanocatalyst support with ultra-high surface area and thermal stability," *Crystengcomm*, vol. 15, No. 41: 8345-8352 (Aug. 19, 2013).
Guo, Y., et al., "Robust 3-D configurated metal oxide nano-array based monolithic catalysts with ultrahigh materials usage efficiency and catalytic performance tunability," *Nano Energy*, 2: 873-881 (2013).
Han, et al., "Transition Metal Oxide Core-Shell Nanowires: Generic Synthesis and Transport Studies," *Nano Letters* 2004, vol. 4, No. 7., pp. 1241-1246 (2004).
Hoang, S., et al., "High performance diesel oxidation catalysts using ultra-low Pt loading on titania nanowire array integrated cordierite honeycombs," *Catalysis Today*, Nov. 1, 2017.
Hosono, E., et al., "Growth of Submicrometer-Scale Rectangular Parallelepiped Rutile $TiO_2$ Films in Aqueous $TiCl_3$ Solutions under Hydrothermal Conditions," *J. Am. Chem. Soc.* 126: 7790-7791 (2004).
Hsu, H.C., et al., "Band gap engineering and stimulated emission of ZnMgO nanowires," *Applied Physics Letters*, 89: 3 pages (2006).
Hu, W., et al., "High-Quality Brookite $TiO_2$ Flowers: Synthesis, Characterization, and Dielectric Performance," *Crystal, Growth and Design*, 9(8): 3676-3682 (2009).
Hwang, D.K., et al., "Effects of deposition temperature on the properties of $Zn_{1-x}Mg_xO$ thin films," *Applied Surface Sciences*, 225: 217-222 (2004).
Jian, D., et al., "Synthesis, characterization, and photocatalytic properties of $ZnO/(La,Sr)CoO_3$ composite nanorod arrays," *J. Mater. Chem.*, 19: 970-975 (2009).
Jiang, S., et al., "High-performance binder-free supercapacitor electrode by direct growth of cobalt-manganese composite oxide nansostructures on nickel foam," *Nanoscale Research Letters*, 9: 492, 8 pages (2014).
Joshi, et al., "Au Decorated Zinc Oxide Nanowires for CO Sensing," *J. Phys. Chem. C.*, 113: 16199-16202 (2009).

(56) References Cited

OTHER PUBLICATIONS

Kar, J.P., et al., "Fabrication and characterization of vertically aligned ZnMgO/ZnO nanowire arrays," *Materials Science and Engineering B*, 147: 74-78 (2008).
Kim, "Calculation of Formation Energy of Oxygen Vacancy in ZnO Based on Photoluminescence Measurements," *J. Phys. Chem. B*, 114: 7874-7878 (2010).
Kim, C. H, et al., "Strontium-Doped Perovskites Rival Platinum Catalysts for Treating $NO_x$ in Simulated Diesel Exhaust," *Science*, 327: 1624-1626(2010).
Kling. R., et al., "Analysis of ZnO and ZnMgO nanopillars grown by self-organization," *Nanotechnology*, 15: 1043-1046 (2004).
Li, L., et al., "One-dimension $MnCO_2O_4$ nanowire arrays for electrochemical energy storage," *Electrochimica Acta*, 116: 467-474 (2014).
Lin, C, et al., "Effect of Calcination Temperature on the Structure of a $Pt/TiO_2$ (B) Nanofiber and Its Photocatalytic Activity in Generating $H_2$," *Langmuir*, 24: 9907-9915 (2008).
Liu, W., et al., "The deposition and annealing study of MOCVD ZnMgO," *Journal of Crystal Growth*, 227: 416-421 (2005).
Liu, B. et al., "Oriented single crystalline titanium dioxide nanowires," *Nanotechnology*, 19(50): 505604 (2008).
Lorenz, M., et al., "$Mg_xZn_{1-x}O(\pm x<0.2)$ nanowire arrays on sapphire grown by high-pressure pulsed-laser deposition," *Applied Physics Letters*, 86: 3 pages (2005).
Ohtomo, A., et al., "Structure and optical properties of $ZnO/Mg_{0.2}Zn_{0.8}O$ superlattices." *Applied Physics Letters*, 75(7): 980-982 (1999).
Plank, et al., "A simple low temperature synthesis route for ZnO—MgO core-shell nanowires," *Nanotechnology*, 19, 8 pages, 465603 (2008).
Qiu, M., et al., "Facile preparation of ordered mesoporous $MnCo_2O_4$ for low-temperature selective catalytic reduction of NO with $NH_3$," *Nanoscale*, 7: 2568-2577 (2015).
Satterfield, C.W., *Heterogeneous Catalysis in Industrial Practice*, 2nd Edition, McGraw-Hill, Inc., New York, 1991.
Shaikh, et al., "Thermal conductivity of an aligned carbon nanotube array," *Carbon*, 45: 2608-2613 (2007).
Shan, et al., "A Simple Route to Porous ZnO and ZnCdO Nanowires," *J. Phys. Chem. B*, 110: 11176-11179 (2006).
Shimpi, P., et al., "Annealing induced nanostructure and photoluminescence property evolution in solution-processed Mg-Alloyed ZnO nanowires," *Applied Physics Letters*, 97: 103104, 3 pages (2010).
Shimpi, P., et al., "Low temperature synthesis and charactcrization of MgO/ZnO composite nanowire arrays," *Nanotechnology*, 20: 125608, 1-8 (2009).
Sridharan, K., et al., "Anomalous growth of multi-phased and multi-dimensional Manganese oxidc-Mctal (Fc, Co and Ni) oxide nanostructures: Synthesis and optical limiting properties," *Journal of Alloys and Compounds*, 611: 82-90 (2014).
Tang, et al., "ZnO nanowires grown along the non-polar direction," *Materials Letters*, 62: 1393-1395 (2007).
Tang, W., et al., "Synergistic Effects in Porous Mn—Co Mixed Oxide Nanorods Enhance Catalytic Deep Oxidation of Benzene," *Catal Lett*, 144: 1900-1910 (2014).
Tang, W., et al., "Scalable Integration of Highly Uniform $Mn_xCo_{3-x}O_4$ Nanosheet Array onto Ceramic Monolithic Substrates for Low-Temperature Propane Oxidation," *ChemCatChem*, 9: 4112-4119(2017).
Tang, W., et al., "Pre-surface leached corierite honeycombs for $Mn_xCO_{3-x}O_4$ nano-sheet array integration with enhanced hydrocarbons combustion," *Catalysis Today*, Nov. 1, 2017.
Wang, G., et al., "Growth and properties of ZnO/Hexagonal ZnMgO/Cubic ZnMgO nanopagoda heterostructures," *J. Phys. D: Appl. Phys.*, 40: 5287-5290 (2007).

Wang, Q., et al., "Compacted nanoscale sensors by merging ZnO nanorods with interdigitated electrodes," Proc. of SPIE 8031, Micro- and Nanotechnology Sensors, Systems, and Applications III, 80312J (2011).
Wang, Y., et al., "Preparation of Tractable Platinum, Rhodium, and Ruthenium Nanoclusters with Small Particle Size in Organic Media," *Chem. Matter.*, 12(6): 1622-1627 (2000).
Williams, J.L., "Monolith structures, materials, properties and uses," *Catalysis Today*, 69: 3-9 (2001).
Xic, X., et al., "Low-tcmpcraturc oxidation of CO catalyzed by $Co_3O_4$Nanorods," *Nature*, 458: 746-749 (2009).
Yu, L., et al., "Controlled synthesis of hierarchical $Co_xMn_{3-x}O_4$ array micro-/nano structures with tunable morphology and composition as integrated electrodes for lithium-ion batteries," *Energy & Environmental Science*, 6: 2664-2671 (2013).
Yuhas, et al., "Transition-Metal Doped Zinc Oxide Nanowires," *Angew. Chem.*, 118: 434-437 (2006).
Zhang, "One-dimensional metal oxide nanostructures for heterogeneous catalysis," *Nanoscale*, 5: 7175 (2013).
Zhang, Z., et al., "In situ TPR Removal: a generic method for fabricating tubular array devices with mechanical and structural soundness, and functional robustness on various substrates," *J. of Materials Chemistry*, 22(43): 23098-23105 (Sep. 6, 2012).
Zhou, H.P., et al., "Thermally Stable $Pt/CeO_2$ Hetero-Nanocomposites with High Catalytic Activity," *J. Am. Chem. Soc.*, 132(14): 4998-4999 (2010).
Zhu, "Perovskite oxide nanotubes: synthesis, structural characterization, properties and applications," *Journal of Materials Chemistry*, 20: 4015-4030 (Feb. 2010).
Zhu, L., et al., "Catalyst-free two-step growth of quasialigned ZnMgO nanorods and their properties," *Applied Physics Letters*, 88: 3 pages (2006).
International Application No. PCT/US2018/035685 International Search Report and Written Opinion dated Aug. 29, 2018, for application entitled "Manganese-Cobalt Spinel Oxide Nanowire Arrays,".
Guo, et al., "Robust 3-D configurated metal oxide nano-array based monolithic catalysts with ultrahigh materials usage efficiency and catalytic performance tunability," Nano Energy, vol. 2, pp. 873-881, 2013.
Jiang, et al., "High-performance binder-free supercapacitor electrode by direct growth of cobalt-manganese composite oxide nansostructures on nickel foam," Nanoscale Research Letters, vol. 9, No. 493, 8 pages, 2014.
Li, et al., "One-dimension MnCo2O4 nanowire arrays for electochemical energy storage," Electrochimica Acta, vol. 116, pp. 467-474, 2014.
Qiu, et al., "Facile preparation of ordered mesoporous MnCo2O4 for low-temperature selective catalytic reduction of NO with NH3," Nanoscale, vol. 7, pp. 2568-2577, 2015.
Sridharan, et al., "Anomalous growth of multi-phased and multi-dimensional Manganese oxide-Metal (Fe, Co and Ni) oxide nanostructures: Synthesis and optical limiting properties," Journal of Alloys and Compounds, vol. 611, pp. 32-90, 2014.
Tang et al., "Synergistic Effects in Porous Mn—Co Mixed Oxide Nanorods Enhance Catalytic Deep Oxidation of Benzene," Catal Lett, vol. 144, pp. 1900-1910, 2014.
Tang et al., "Pre-surface leached cordierite honeycombs for MNxCo3—xO4 nano-sheet array integration with enhanced hydrocarbons combustion," Catalysis Today, 8 pages, 2017.
Tang, et al., "Scalable Integration of Highly Uniform MnxCo3—xO4 Nanosheet Array onto Ceramic Monolithic Substrates for Low-Temperature Propane Oxidation," ChemCatCem, vol. 9, pp. 4112-4119, 2017.
Yu, et al., "Controlled synthesis of hierarchical CoxMn3—xO4 array micro-/nanostructures with tunable morphology and composition as integrated electrodes for lithium-ion batteries," Energy & Environmental Science, vol. 6, pp. 2664-2671, 2013.

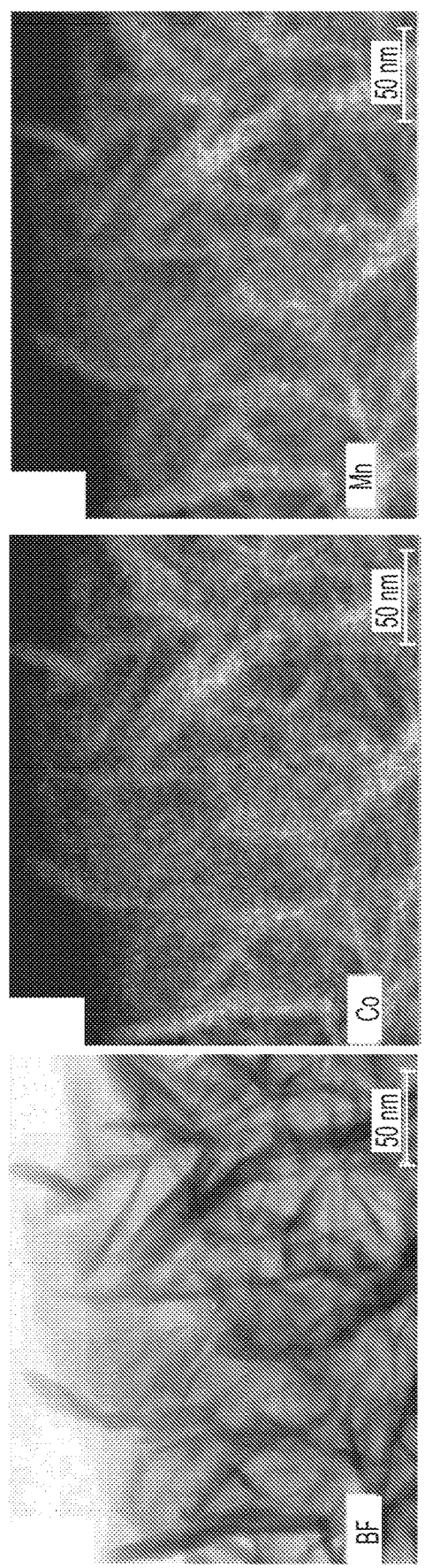

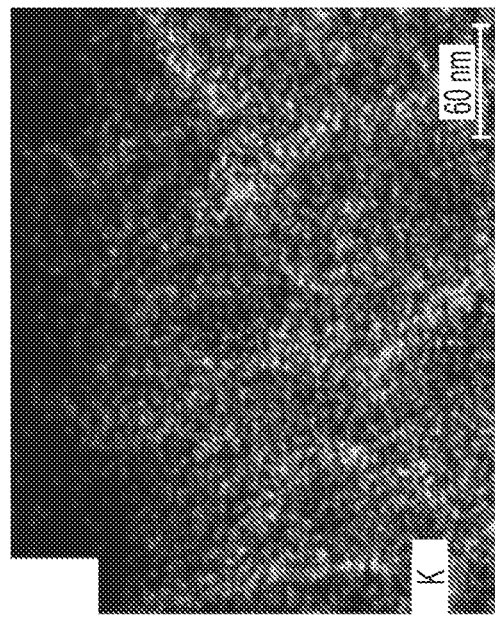
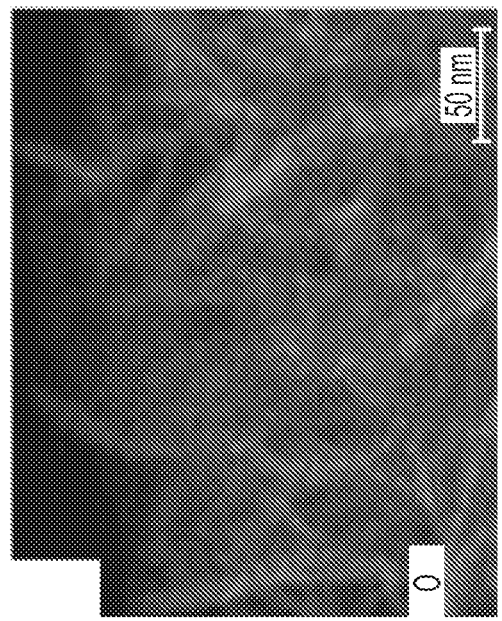
FIG. 6D
FIG. 6E

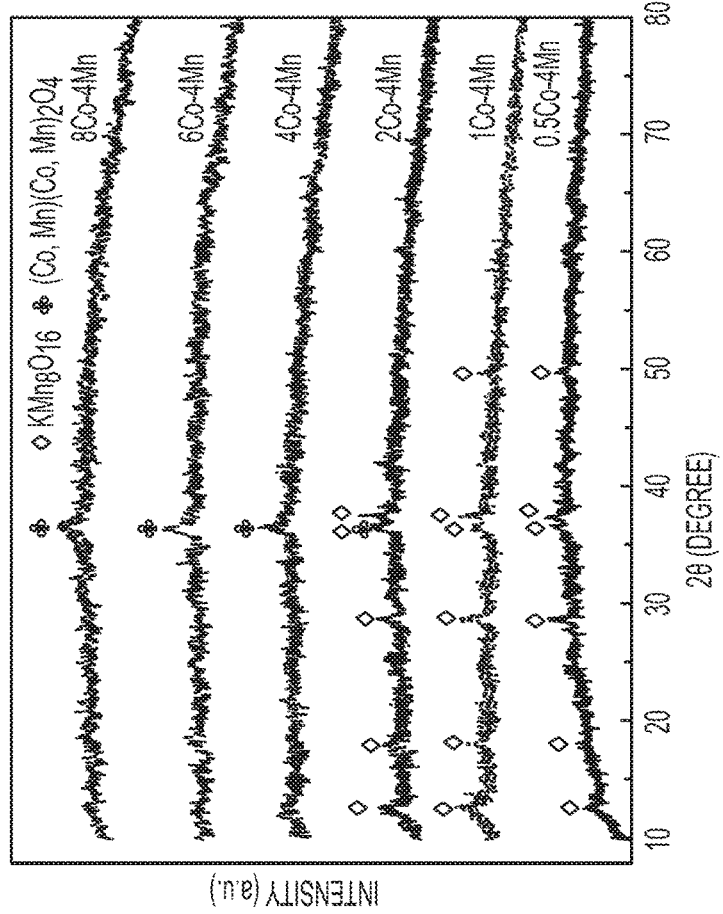
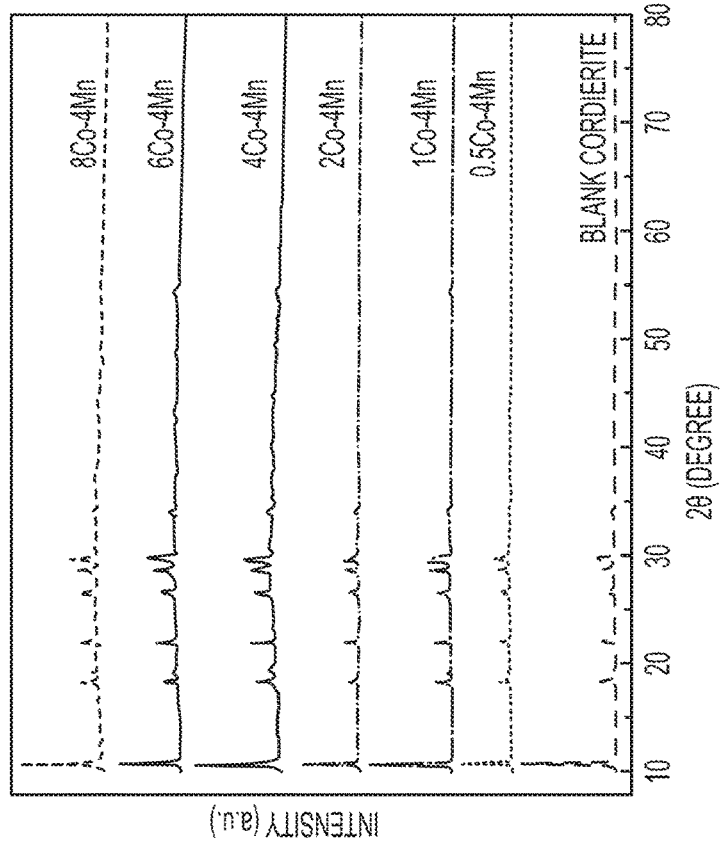
FIG. 7A
FIG. 7B

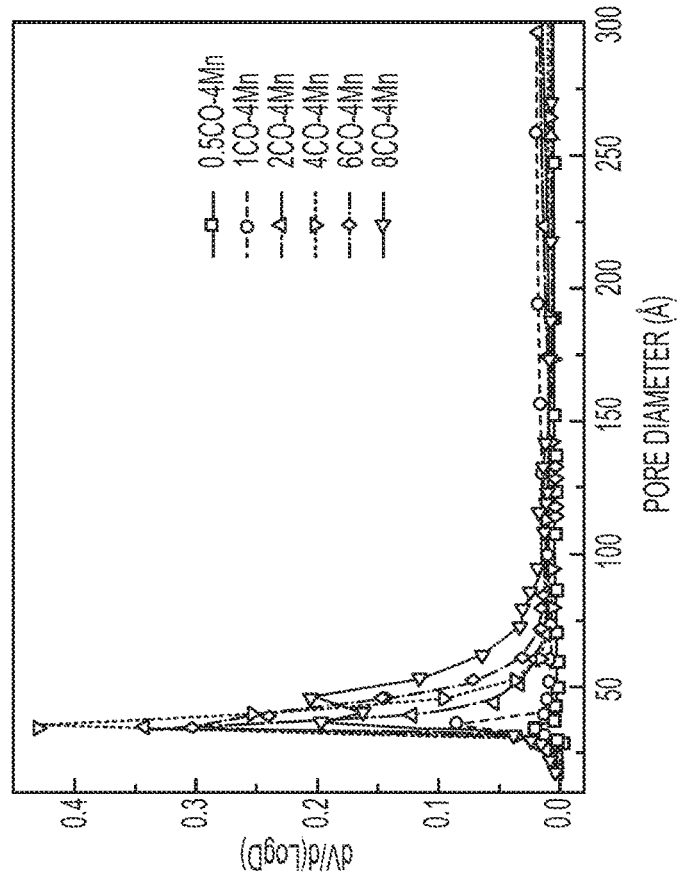
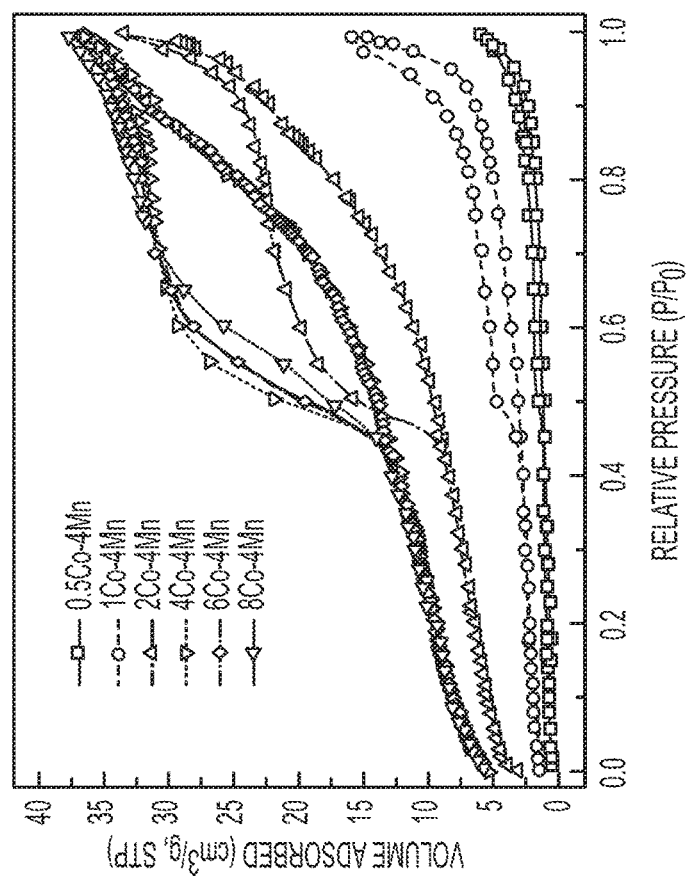
FIG. 8A
FIG. 8B

MANGANESE-COBALT SPINEL OXIDE NANOWIRE ARRAYS

RELATED APPLICATION

This application is the U.S. National Stage of International Application No. PCT/US2018/035685, filed Jun. 1, 2018, which designates the U.S., published in English, and claims the benefit of U.S. Provisional Application No. 62/513,544, filed on Jun. 1, 2017. The entire teachings of the above applications are incorporated herein by reference.

GOVERNMENT SUPPORT

This invention was made with government support under Grant No. DE-FE0011577 from the United States Department of Energy; under Grant No. DE-EE0006854 from the United States Department of Energy; and under Grant No. CBET1344792 from the United States National Science Foundation. The government has certain rights in the invention.

BACKGROUND

Combustion exhaust, particularly from diesel combustion, contributes to emission of a variety of gases, including carbon monoxide (CO), nitric oxide (NO), and hydrocarbons. Such gases are emitted from a variety of diesel engines, such as automobiles, marine engines, and generators. Catalysts are employed to catalyze oxidation of these gases, but traditional wash-coated catalysts do not catalyze oxidation as effectively at lower temperatures as compared to higher temperatures. In addition, traditional catalysts utilize platinum group metals (PGMs) to enhance catalysis. However, platinum group metals can be expensive.

Additional background information is provided in U.S. Patent Publication No. 2014/0256534 and U.S. Pat. No. 9,561,494.

SUMMARY

Described herein is a low temperature, low pressure, hydrothermal, one-step, solution based process using $KMnO_4$ and $Co(NO)_2$ precursors.

Described herein is a method of making a manganese-cobalt (Mn—Co) spinel oxide nanoarray on a substrate. The method can include contacting a substrate with a solvent, such as water, that includes $MnO_4^-$ and $Co^{2+}$ ions at a temperature from about 60° C. to about 120° C. The method can include dissolving potassium permanganate ($KMnO_4$) in the solvent to yield the $MnO_4^-$ ions. The method can include dissolving cobalt nitrate, such as cobalt nitrate hexahydrate ($Co(NO_3)_2 \cdot 6H_2O$), in the solvent to yield the $Co^{2+}$ ions.

The method can include varying the concentration of $MnO_4^-$ and $Co_{2+}$ ions in the solvent to control the density of the manganese-cobalt spinel oxide nanoarray. The method can include controlling the temperature of the solvent to control the density of the manganese-cobalt spinel oxide nanoarray.

The method can include contacting a substrate with a solvent comprising $MnO_4^-$ and $Co^{2+}$ ions at a temperature from about 60° C. to about 120° C. at least twice to increase the thickness of the manganese-cobalt spinel oxide nanoarray.

Described herein is a manganese-cobalt (Mn—Co) spinel oxide nanoarray on a substrate. The nanoarray can be free of precious metals. The nanoarray can be free of platinum group metals, such as platinum, palladium, and rhodium. The spinel metal oxide nanoarray can include $Mn_xCo_{3-x}O_4$, where x is between 0 and 3, preferably from 1 to 2, even more preferably about 1.5.

The substrate can have a honeycomb structure. The substrate can be cordierite, such as a cordierite honeycomb. The substrate can be etched.

Described herein is a method of reducing the concentration of an impurity in a gas. The method can include contacting the gas with a manganese-cobalt (Mn—Co) spinel oxide nanoarray, such as those nanorays described herein. The impurity can be a hydrocarbon. The gas can be from an emission source.

The redox reaction between $KMnO_4$ and $Co(NO_3)_2$ was designed and readily utilized for scalable integration of spinel $Mn_xCo_{3-x}O_4$ nano-sheet arrays with three-dimensional (3D) ceramic honeycombs by controlling the reaction temperature. The $Co^{2+}$ can reduce $MnO_4^-$ to form Mn—Co spinel oxide nano-sheet arrays uniformly on the channel surface of cordierite honeycomb. The novel PGM free oxide nano-sheet array integrated ceramic honeycomb monolith shows good low temperature catalytic activity for propane oxidation, with the 50% conversion temperature achieved at 310° C. which was much lower than that over the wash-coated commercial $Pt/Al_2O_3$. These integrated Mn—Co composite oxide nano-arrays may hold great promise for the construction of advanced monolithic catalyst for high-performance and low-cost emission control.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIG. 2A: 0.5Co-4Mn; FIG. 2B: 1Co-4Mn; FIG. 2C: 2Co-4Mn; FIG. 2D: 4Co-4Mn; FIG. 2E: 6Co-4Mn; FIG. 2F: 8Co-4Mn.

FIGS. 3A and 3C: top view; FIG. 3B: cross-section view.

FIG. 6A is a TEM image of the Mn—Co-O nanoarray (sample 6Co-4Mn). FIGS. 6B-E are elemental mapping images of the Mn—Co-O nanoarray (sample 6Co-4Mn); FIG. 6B: Co; FIG. 6C: Mn; FIG. 6D: O; FIG. 6E: K.

FIG. 7A is XRD patterns of Mn—Co-O nanoarrays on monolithic cordierite substrate. FIG. 7B is XRD patterns of Mn—Co-O powders collected from synthetic reaction.

FIG. 8A is a graph of $N_2$ adsorption-desorption isotherms of the as-prepared Mn—Co—O nano-sheet arrays on monolithic cordierite substrate. FIG. 8B is a graph of Barrett-Joyner-Halenda (BJH) pore-size distribution of the as-prepared Mn—Co-O nano-sheet arrays on monolithic cordierite substrate.

DETAILED DESCRIPTION

Figure 1:
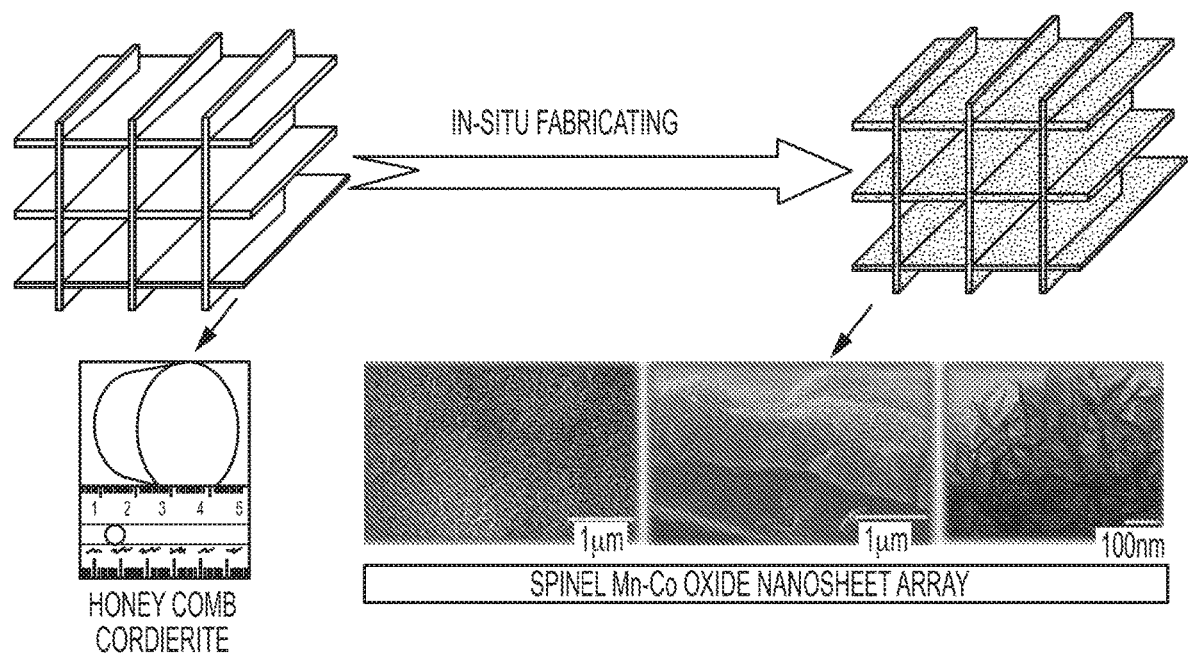
FIG. 1 is a schematic illustration of an Mn—Co—O nano-array growth process accompanied with a photo of full-size cordierite honeycomb substrate, and the resultant spinel oxide nano-array on it after the designed reaction.

A description of example embodiments follows.

As used herein, the term platinum group metal (PGM) refers to platinum, palladium, rhodium, osmium, iridium, and ruthenium.

One of skill in the art will appreciate that different PGMs can have different catalytic activity and can be useful for different applications.

Due to the multiple valency states of manganese ions, manganese oxide with mixed-valent (Mn) framework can be achieved by a series of reactions such as reduction or oxidation of $Mn^{2+}$ cation[1], $MnO_4^-$ species[2,3], and reduction-oxidation between $Mn^{2+}$ and $MnO_4^-$ ions[4,5]. Some oxidants such as $K_2Cr_2O_7$[6], $(S_2O_8)^{2-}$[7, 8], $NaClO$[8] and carbon[9], have been applied for oxidizing $Mn^{2+}$ to yield $MnO_x$. Although some of their redox potentials are close to $Mn^{4+}/Mn^{2+}$ (1.23 V), the reaction could be still proceeded by controlling the reaction temperature and solution acidity. Potassium permanganate, a strong oxidizer, has been usually selected as a manganese precursor for synthesis of manganese oxide related materials under acidic condition. Because standard redox potential of $MnO_2/Mn^{2+}$ (1.224 V) is much higher than $MnO_4^-/MnO_2$ (0.595 V), manganese salts with lower manganese oxidation state ($Mn^{2+}$) have been usually used for reducing $MnO_4^-$ to obtain manganese oxide such as octahedral molecular sieves (OMS)[5, 10, 11]. Besides the manganese ion-pairs such as $Mn^{4+}/Mn^{2+}$, some other ion-pairs ($Ce^{4+}/Ce^{3+}$, $Co^{3+}/Co^{2+}$ and $Cu^{2+}/Cu^+$) may be considered for the reduction of $MnO_4^-$ into related $MnO_x$ or composite oxides. However, due to their incompatible standard redox potential near room temperature, using other metal ions with low oxidation state for the reduction of $MnO_4^-$ have been usually ignored so far.

Mn—Co spinel oxide, an important solid solution composite oxide with a general formula of $(Co, Mn)(Co, Mn)_2O_4$, has attracted great attention as heterogeneous catalysts and battery anode materials, owing to its favorable features such as low cost, easy accessibility, high stability, redox-active metal centers, and environmental friendless[12-14]. Much research has been reported on the synthesis of powder-based Mn—Co composite oxides with significantly promoted activity through nanostructuring. However, it is usually accompanied with compromised performance after the assembly of nanostructured powder-based devices. In ceramic honeycomb monolith with separate 3D channels, the direct integration with hierarchical Mn—Co oxide array structure remains a challenge due to the difficulty to grow nanostructures uniformly in deep channels.

Described herein is a successfully designed and utilized redox reaction between $KMnO_4$ and $Co(NO_3)_2$ at controllable temperature for directly growing Mn—Co composite oxide nanostructure arrays onto 3-D channeled cordierite honeycomb substrates. With uniform deposition in the form of nanostructure arrays, the Pt-group metal (PGM) free Mn—Co spinel oxide integrated honeycomb monolith can be scaled up in full size with good catalytic propane oxidation activity at low temperature superior to the Pt/$Al_2O_3$ wash-coated monolithic catalysts. Materials loading can be dramatically reduced on the nanostructure array monolithic catalysts, while the well-defined structural characteristics and distribution enabled by array nanostructures allow effective mass transport and enable improved reaction chemistry and kinetics[15].

Varying the concentration of $MnO_4^-$ or $Co_{2+}$ ions in the solvent can permit control of the deposition rate of the manganese-cobalt spinel oxide nanoarray. Increasing the concentration of the ions can increase the rate at which those ions are deposited to form a nanoarray. Controlling the temperature of the solvent can also control deposition rate of the manganese-cobalt spinel oxide nanoarray. Increasing the temperature of the solvent can increase the rate at which ions are deposited to form a nanoarray.

Mn—Co spinel oxide nano-array based monolith can be in situ fabricated on various commercial substrates like metal fiber/foil/film, carbon fiber/film/foam, ceramic/alumina/silicon carbide/stainless steel honeycomb by applying a solution hydrothermal strategy at low temperature and low pressure. This monolithic material with high surface area and high materials utilization efficiency can be directly used for environment and energy applications including emission control systems, air/water purifying systems and lithium-ion batteries.

Preferably, the substrate comprises a honeycomb cordierite.

Mn—Co spinel oxide is usually used for the anodes in lithium-ion batteries with high capacity and cycle life. It is also used as a non-precious-metal catalyst for controlling emissions, e.g., CO oxidation, hydrocarbon combustion, NO oxidation and reduction etc. By integrating this Mn—Co oxide array on conductive substrate (metal and carbon), the product can be directly used as an anode electrode in rechargeable lithium-ion batteries (LIBs). For non-conductive substrates like ceramic/alumina/silicon carbide honeycomb, the product covered with Mn—Co oxide nano-array can be directly used as an active catalyst for catalytic oxidation/reduction and to be a high-surface support for loading a platinum group metal (PGM) instead of a wash-coating procedure. The developed catalytic device can be used in an emission control system e.g., a diesel oxidation catalyst, volatile organic compounds (VOCs) combustion reactor, indoor air purification etc.

Powder based industry typically requires further processes, like pelleting and washcoating, for practical applications. These further processes typically compromise material utilization efficiency. Additionally, these process steps increase the length of production time.

As disclosed herein, Mn—Co array nanostructures can be integrated directly onto various substrates, which accomplishes the application of metal oxides based nanomaterials without any further powder-based procedures. Directly integrating the Mn—Co array nanostructures onto a commercial substrate can significantly reduce fabrication time and costs while creating a product having an ultra-high materials utilization efficiency.

The nanostructure monoliths disclosed herein have several advantages. The monolithic Mn—Co oxide array nanostructure has excellent contact with substrate, high surface area, well-defined structural and geometrical configurations, and high materials utilization efficiency. The in situ integrating technology can fully keep the nanostructure-derived properties exposed instead of compromising the performance and materials utilization efficiency which is always a great challenge in the powder-based industry.

FIG. 1 shows the in situ growth process of Mn—Co oxide nanosheet array on cordierite honeycomb. Through this in situ fabricating technology, the Mn—Co oxide array nanostructures assembled by numerous nanosheets can be uniformly grown on the substrate surface as the SEM and TEM images displayed in FIG. 1. The growth process includes immersing substrate into the mixed solution containing $MnO_4^-$ and $Co^{2+}$ ions, then controlling the growth at 60-120° C. The higher thickness of array nanostructures can be achieved by repeating the growth process, and the density of array can be controlled by the precursor concentration and reaction temperature.

Optionally, the cordierite honeycomb is contacted with basic solution to form an etched cordierite honeycomb. In general, the basic solution can be a NaOH, KOH, or NH4OH solution, the treating time is in the range of 2-48 hours, and the treatment temperature is in the range of 40-120 degree C. In general, the concentration of the NaOH, KOH or $NH_4OH$ is in the range of about 0.5M to about 3M, with about 2M being a preferred concentration. Weak bases, such as ammonia, can be acceptable. The cordierite honeycomb treated in this way is referred to herein as etched cordierite honeycomb. Alternatively, etched cordierite honeycomb is prepared by contacted cordierite honeycomb with an acidic solution for comparable times and at comparable temperatures. Suitable acidic solutions include hydrochloric acid, sulfuric acid, and phosphoric acid, though weaker acids, such as acetic acid and oxalic acid, can be acceptable as well.

Mn—Co—O sheet arrays disclosed herein can be grown on unmodified (e.g. not etched) cordierite honeycomb and on etched cordierite honeycomb. The growth method is the same in each case, but the resultant structures differ. Compared to an Mn—Co—O sheet array grown on a non-etched cordierite honeycomb, an Mn—Co—O sheet array grown on etched cordierite has improved performance for hydrocarbon combustion due to greater surface area and being more populated with a wider range of pore sizes, based on Brunauer-Emmett-Teller (BET) analysis. The activity of the resulting catalyst for hydrocarbons combustion can be enhanced by adjusting the porosity of the Mn—Co—O sheet array.

EXEMPLIFICATION

Example #1

Experimental

Materials Preparation

Cobalt nitrate hexahydrate ($Co(NO_3)_2.6H_2O$) was applied as a reducing agent to react with potassium permanganate ($KMnO_4$), which could make the formation of Mn—Co composite oxide on the surface of ceramic cordierite. Before growth, ceramic cordierite honeycomb was ultra-sonicated for 30 minutes in ethanol to remove the residual contamination and washed with DI water, then dried at 90° C. for further use. The cordierite honeycomb substrate (1 cm×2 cm×3 cm, mesh 600) was suspended into 40 mL mixed aqueous solution of $Co(NO_3)_2$ and $KMnO_4$. To investigate the reducing effect of $Co(NO_3)_2$ on $KMnO_4$, different molar ratios of $Co(NO_3)_2/KMnO_4$ (the units of both $Co(NO_3)_2$ and $KMnO_4$ are mmol) were used such as 0.5/4, 1/4, 2/4, 4/4, 6/4 and 8/4, where the as-prepared samples were denoted as 0.5Co-4Mn, 1Co-4Mn, 2Co-4Mn, 4Co-4Mn, 6Co-4Mn and 8Co-4Mn, respectively. The mixed solution was then transferred into an electrical oven for hydrothermal synthesis at 95° C. for 12 hours. Notably, no reaction occurs before the temperature reaches a minimum threshold, which is dependent upon the reactant concentration, as described more fully in the Calculation of Gibbs Free Energy. As a result, this confers a degree of control over the reaction, which can be useful for process development (e.g., appropriate selection of heating device). After the reaction, the substrate was withdrawn from the solution and carefully washed to remove the residual precipitate, then dried at 90° C. for 12 hours. Both the monolith and collected powder from the solution were transferred into a muffle furnace and treated at 500° C. for 2 hours in air.

Materials Characterization

X-ray diffraction (XRD) patterns of the as-synthesized Mn—Co nanostructured array were measured on BRUKER AXS D5005 X-ray diffractometer system using Cu-Ka radiation in the diffraction angle (2θ) range 10-80. The Brunauer-Emmett-Teller (BET) surface areas and pore size distributions of all samples were obtained using the $N_2$ adsorption-desorption method on an automatic surface analyzer (ASAP 2020, Micromeritics Cor.). For each measurement, all samples were degassed at 150° C. for 6 h. The morphology and structure were recorded on a scanning electron microscope (SEM, FEI Teneo LVSEM).

The microstructures of selected sample were obtained by using transmission electron microscopy (TEM, FEI Talos S/TEM) with an accelerating voltage of 200 kV. Hydrogen temperature programmed reduction ($H_2$-TPR) was carried out in a U-shaped quartz reactor under a gas flow (5% $H_2$ balanced with Ar, 25mLmin$^{-1}$) on a Chemisorption system (ChemiSorb 2720, Micromeritics Cor.). In each run, sample with 49 channels (7 mm×7 mm×10 mm) was used and the temperature was raised to 750° C. from room temperature at a constant rate of 10° C. min$^{-1}$.

Catalytic Test

Catalytic propane combustion was selected as a probe reaction to illustrate activity of as-prepared nanostructured 3D Mn—Co composite array. Hydrocarbons generated from mobile and stationary combustion sources, such as automobiles, petrochemical, and power generation plants, play an important role in the formation of photochemical smog and ozone pollution and some are difficult to remove like propane. The propane oxidation tests were carried on a Bench- CAT system (Altamira Instruments), and an Agilent Micro-GC were equipped for separating and detecting gaseous species in the exhaust stream. The reactant gas was composed of 0.3% $C_3H_8$, 10% $O_2$ and balanced with $N_2$, and the total flow rate of 50 ml $min^{-1}$. Typically, honeycomb sample with 25 channels (5 mm×5 mm×10 mm) was used to test and the space velocity (SV) was about 12,000 $h^{-1}$. The total weight of the monolithic nanostructured honeycomb was around 0.1 g and the actual catalytic active materials were about 5-20 mg.

Calculation of Gibbs Free Energy $MnO_4^-$ is reduced to $MnO_2$; $Co^{2+}$ is oxidized to $Co^{3+}$. The half-equations are
(1) reduction of $Mn_4^-$:
$MnO_4^- + 4H^+ + 3e \rightleftharpoons MnO_2 + 4OH^-$, $E_1° = 1.679$ V;
(2) $Co^{2+}$ oxidation:
$3Co^{3+} + 3e \rightleftharpoons 3Co^{2+}$, $E_2° = 1.92V$;
$3Co^{2+} \rightleftharpoons 3Co^{3+} + 3e$, $E_3° = -E_2° = -1.92V$;
Then the total reaction is:
$MnO_4^- + 2H_2O + 3Co^{2+} \rightleftharpoons{}^{MnO}2 + 4OH^- + 3Co^{3+}$, $E° = E_1° + E_2° = -0.241V$ So, the standard Gibbs free energy change is
$\Delta G° = -nFE = -3 \times 9.648 \times 10^4 \times (-0.241)$ J = 69.77 kJ, Clearly then, $\Delta G° > 0$, indicating the total reaction cannot be proceeded under the standard condition (T=273.15K, P=101.325 KPa, c=1 mol/L). However, the solubility of $MnO_4^-$ ($KMnO_4$, 0.4 mol/L at 20° C.) are limited, so the actual Gibbs free energy should be calculated from actual reduction potential.

So, the actual reduction potential is $E = E° - (0.257/n)\ln Q$

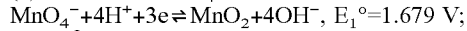

Here, $\ln Q = \ln\dfrac{[Co^{3+}]^3[OH^-]^4}{[Co^{2+}]^3[MnO4]^-}$

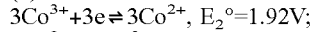

The balanced $[Co^{3+}]$ can be obtained from Ksp-Co$(OH)_3$ ($2.5 \times 10^{-43}$), $[Co^{3+}] = Ksp/[OH^-]^3 = 2.5 \times 10^{-43}/(10^{-14}/[H^+])^3 = 0.25[H^+]^3$

Using $[Co^{2+}] = 0.1$ mol/L, $[MnO_4^-] = 0.1$ mol/L, $[H^+] = [OH^-] = 10^{-7}$ mol/L, $$E = E° - (0.257/n)\ln Q$$
$$= -0.241 - (0.257/3)\ln\dfrac{[0.25H^+]^3[OH^-]^4}{[Co^{2+}]^3[MnO4]^-}$$
$$= -0.241 - (0.257/3) \times (-75.539)$$
$$= 0.406 \text{ V}$$

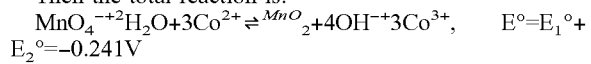

Then, $\Delta G = -nFE = -117.5$ kJ $< 0$

It is noticed that the reaction can be proceeded under our experimental condition. The reaction at room temperature is not clear that might be due to the large activation barriers to the reaction which prevent it from taking place. With raising the temperature, The Gibbs free energy change can be moved to more negative value and the activation barriers can be overcome.

Results and Discussion

Reaction between $MnO_4^-$ and $Co^{2+}$

The reactions between $MnO_4^-$ and $Co^{2+}$ incorporate the Co species into the manganese oxide framework and then form the Mn—Co composite spinel oxide. In an earlier study of a $Co_3O_4MnO_2$ hybrid nanowire array structure on the stainless steel plate, three processes were involved: growth of $Co_3O_4$ nanowires array; deposition of a carbon layer on the $Co_3O_4$ nanowires; and $MnO_2$ shell formation through reduction of $KMnO_4$ with assistance of carbon layer[24]. The prior process is more complex and less controllable than the methods described here.

Figure 2A:
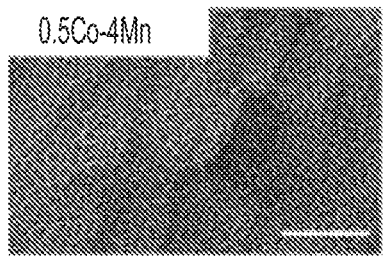
FIGS. 2A-F are SEM images of as-prepared nanoarrays (top view) on monolithic cordierite substrate with different ratio of $Co(NO_3)_2$ and $KMnO_4$ (scale bars are 1 μm).
Figure 2B:
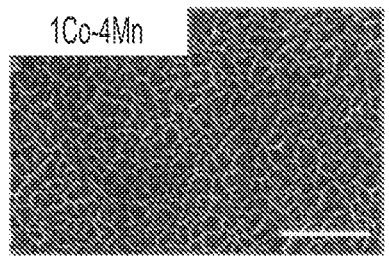
Figure 2C:
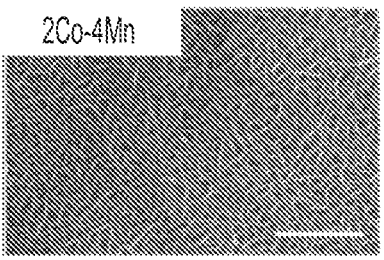
Figure 2D:
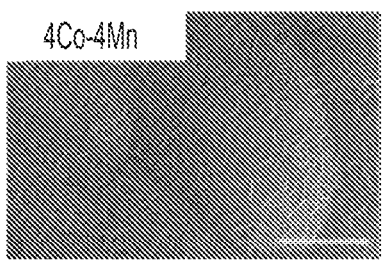
Figure 2E:
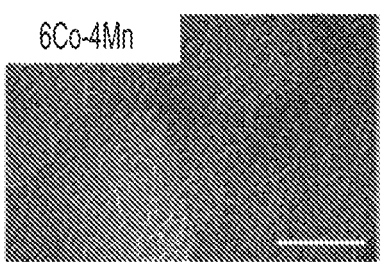
Figure 2F:
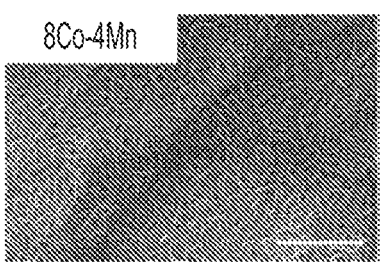
Figure 2G:
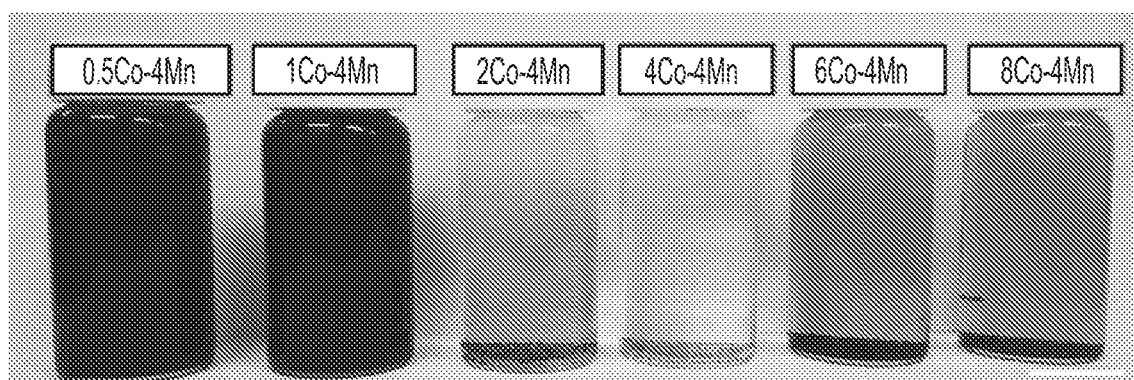
FIG. 2G is a photograph of the solution after synthetic reaction (scale bar is 1 cm).

In the methods described herein, the experiments showed no obvious color change after mixing the $KMnO_4$ and $Co(NO_3)_2$ solution for several days at room temperature, indicating that the reaction between $MnO_4^-$ and $Co^{2+}$ is very slow at room temperature. According to the Nernst equation ($E = E^\ominus - (RT/(nF))\ln Q$), the cell voltage E is influenced by standard voltage Ee, temperature T, and reaction quotient. From the standard reduction potentials of $Co^{3+}/Co^{2+}$ (1.92 V) and $MnO_4^-/MnO_2$ (1.679V), the standard voltage for the reaction between $Co^{2+}$ and $MnO_4^-$ will be positive, indicating the standard free energy change will be negative with the reaction proceed at room temperature (see Calculation of Gibbs Free Energy). However, the reaction at room temperature seems to be negligible due to the large activation barriers to the reaction. With the temperature rise, Gibbs free energy change will be more negative and the activation barriers can be overcome. As a result, a significant reaction can take place when increasing reaction temperature to 95° C. Without wishing to be bound by theory, acceptable reaction rates are typically found between 6. As shown in FIG. 2G, the molar ratio of $Co^{2+}/MnO_4^-$ has a great effect on the reduction-oxidation process. When using $4Co^{2+}/4MnO_4^-$ as the initial molar ratio of reactants, the solution after synthetic reaction looks more colorless and transparent which indicates the reaction completed under this condition. Through the purple and red color of the solution after synthetic reaction, it can be inferred that one of the reactants is surplus when the molar ratio of $Co^{2+}/MnO_4^-$ is lower or higher than 1/1.

One of skill in the art will appreciate that reaction rates are related to both temperate and reactant concentration. Increasing the concentration of reactants will permit acceptable reaction rates at lower concentrations of reactants. Accordingly, acceptable reaction rates can typically be found from about 60° C. to about 120° C., depending on the concentration of reactants. See Calculation of Gibbs Free Energy for more information.

Morphologies and Microstructures

Scanning electron microscopy (SEM) and transmission electron microscopy (TEM) were used for studying the morphological features of as-prepared Mn—Co composite oxide nano-arrays. As shown in FIGS. 2A-F, the SEM images suggest that all nano-arrays with porous architectures were assembled by numerous nano-sheet array which were perfectly grown on the ceramic surface of honeycomb cordierite. Such porous array structures can provide very large active surface areas to facilitate the diffusion of reactant molecules when they are applied as catalysts. With increasing molar ratio of reactants ($Co^{2+}/MnO_4^-$), the assembled nano-sheets become denser due to the higher deposition ratio on the surface. As listed in Table 1, the weight loading ratios are varied from 3% to 20%. This value kept stable when the molar ratio of $Co^{2+}/MnO_4^-$ is higher than 4 mmol/4 mmol which means all $MnO_4^-$ has been reduced by enough $Co^{2+}$. With higher molar ratio, the $Co^{2+}$ will be surplus which can be estimated by the solution color as displayed in FIG. 2G.

TABLE 1

Loading ratio, BET surface area, pore diameter, pore volume and T50 (the reaction temperatures for propane conversions of 50%) of the as-prepared Mn—Co—O nanoarrays based monoliths.

| Sample | $Co(NO_3)_2/KMnO_4$ (Reactants ratio) | Loading ratio (wt. %) | BET surface area ($m^2 g^{-1}$) | Pore diameter (nm) | Pore volume ($cm^3 g^{-1}$) | T50 (° C.) |
|---|---|---|---|---|---|---|
| 0.5Co—4Mn | 0.5 mmol/4 mmol | 3.9 | 3.2 | 9.6 | 0.009 | >500 |
| 1Co—4Mn | 1 mmol/4 mmol | 10.4 | 8.1 | 9.1 | 0.025 | 495 |
| 2Co—4Mn | 2 mmol/4 mmol | 18.7 | 24.1 | 8.8 | 0.052 | 413 |
| 4Co—4Mn | 4 mmol/4 mmol | 20.5 | 35.1 | 4.5 | 0.057 | 345 |
| 6Co—4Mn | 6 mmol/4 mmol | 19.7 | 35.6 | 4.6 | 0.058 | 310 |
| 8Co—4Mn | 8 mmol/4 mmol | 19.6 | 35.6 | 5.0 | 0.060 | 357 |

Figure 3A:
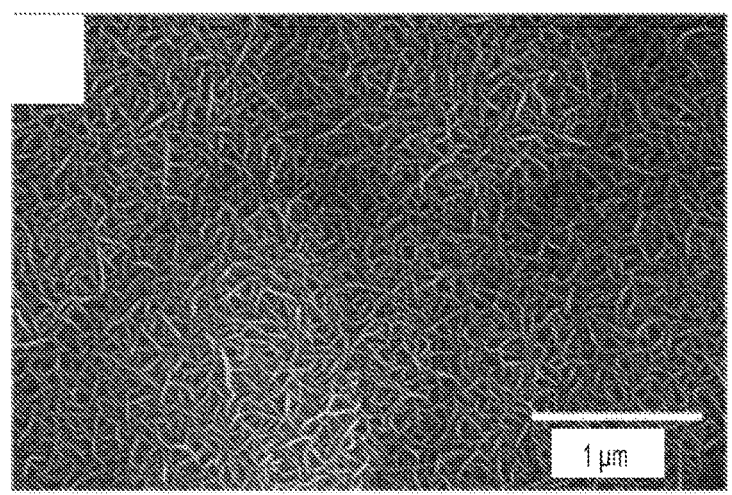
FIGS. 3A-C are SEM images of the Mn—Co-O nano-arrays on monolithic cordierite substrate (sample 6Co-4Mn).
Figure 3B:
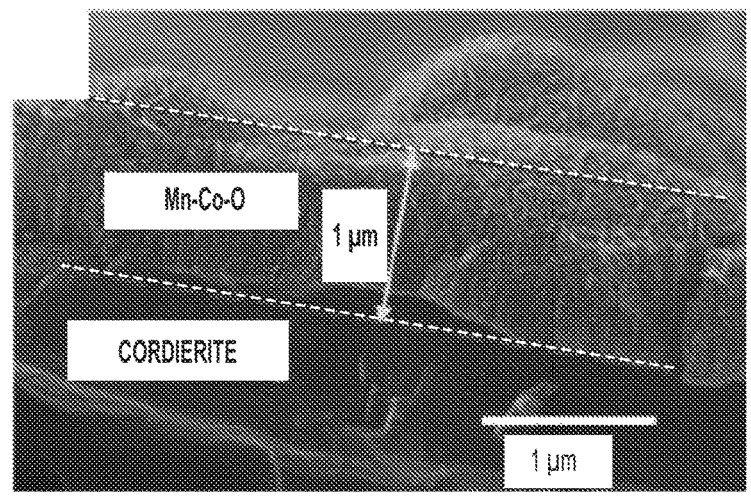
Figure 3C:
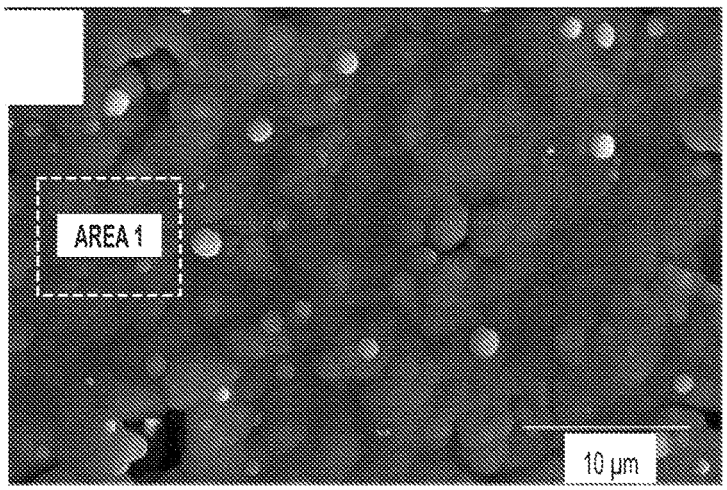
Figure 3D:
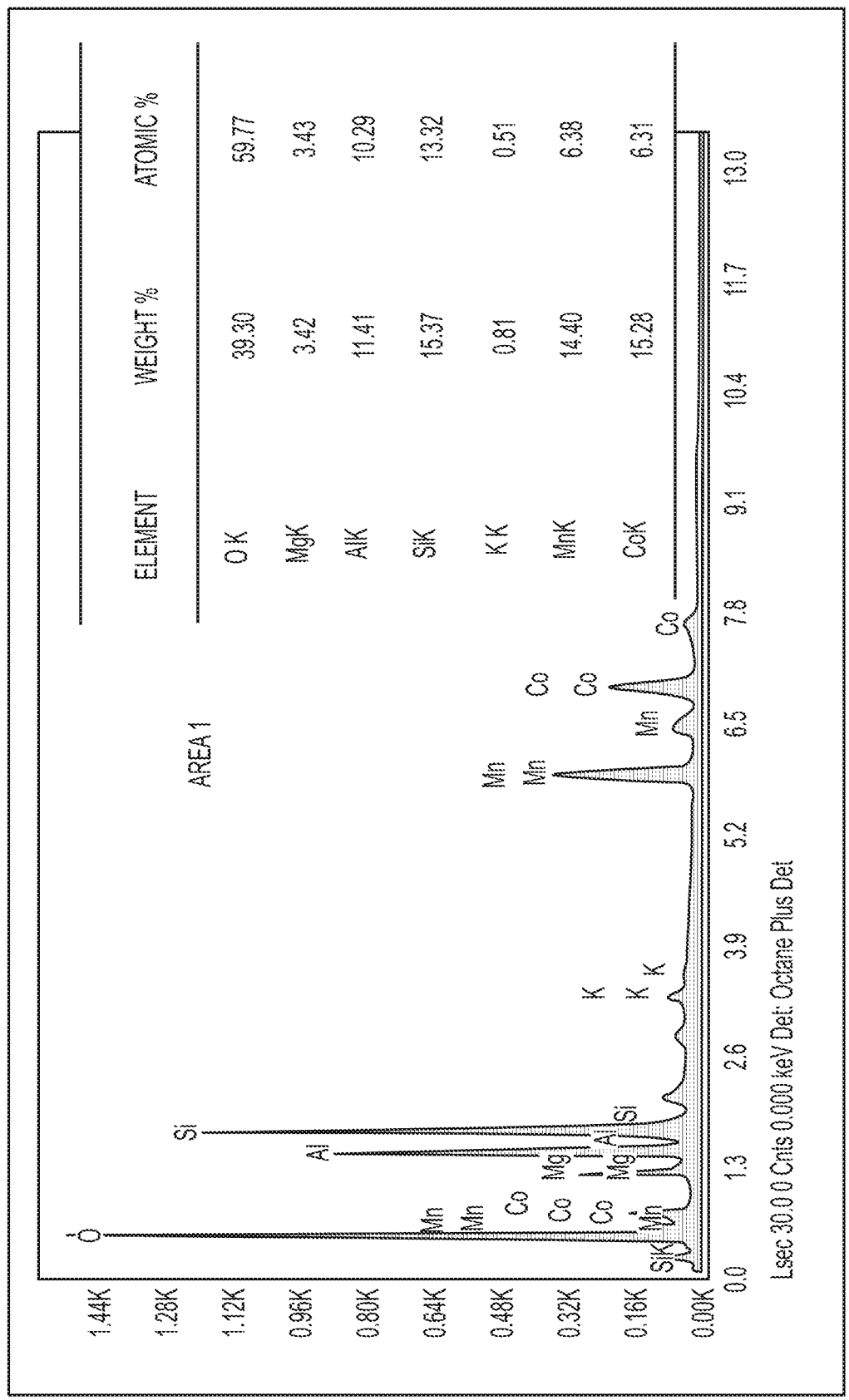
FIG. 3D is a selected area SEM-EDX spectrum of the Mn—Co-O nano-arrays (sample 6Co-4Mn).
Figure 4A:
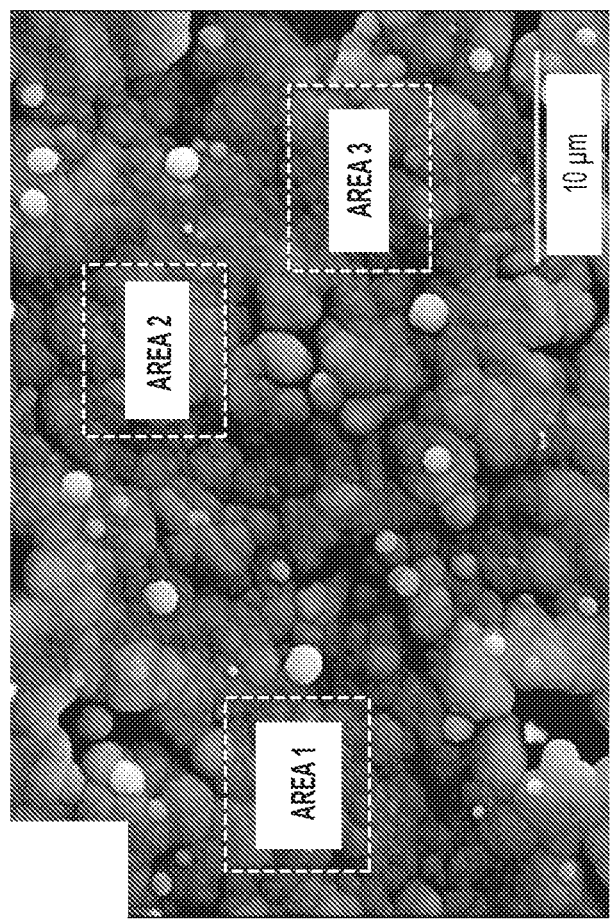
FIG. 4A is an SEM image (top view) of the Mn—Co-O nano-arrays on monolithic cordierite substrate (sample 6Co-4Mn).
Figure 4B:
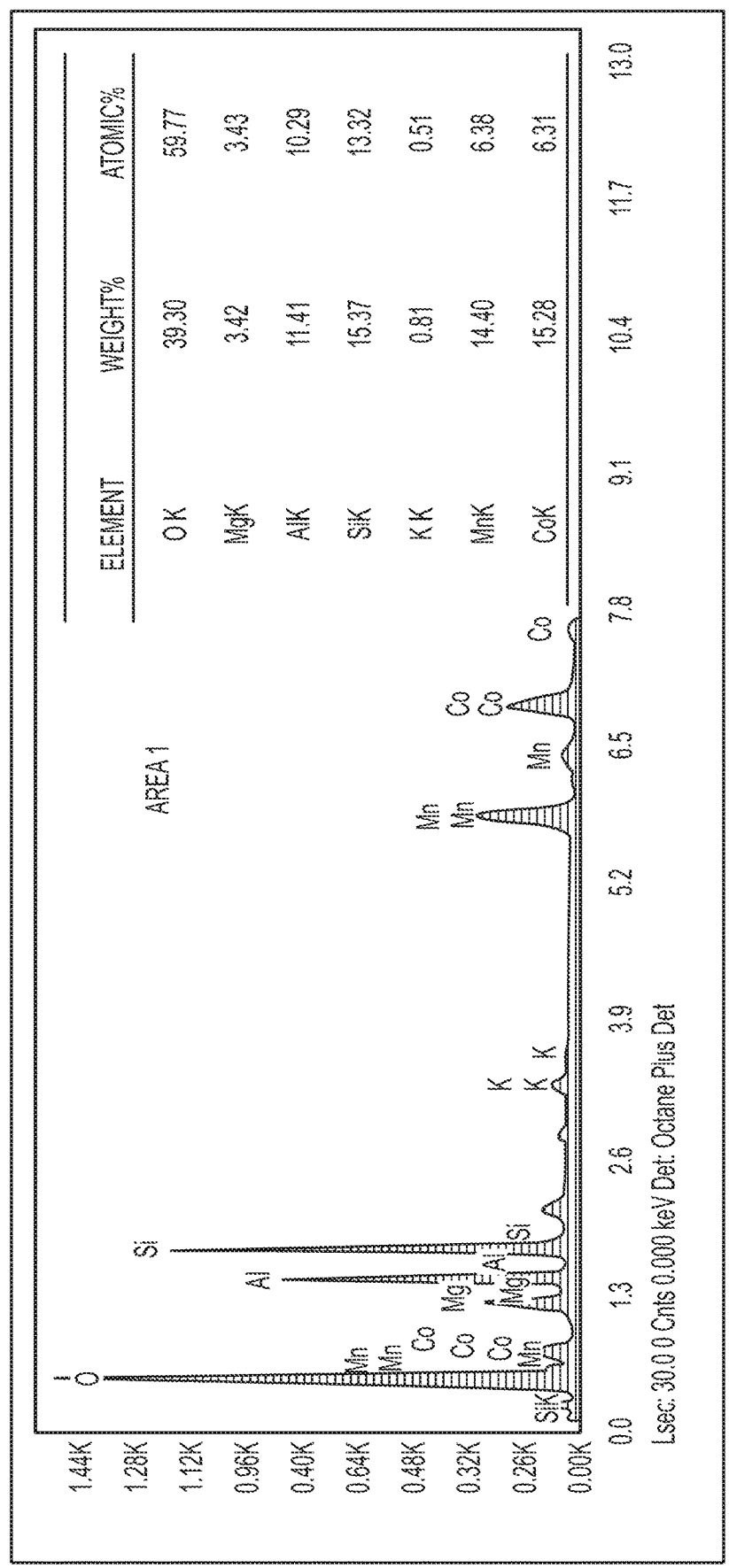
FIGS. 4B-D are SEM-EDX spectra of the Mn—Co-O nano-arrays on monolithic cordierite substrate (sample 6Co-4Mn).
Figure 4C:
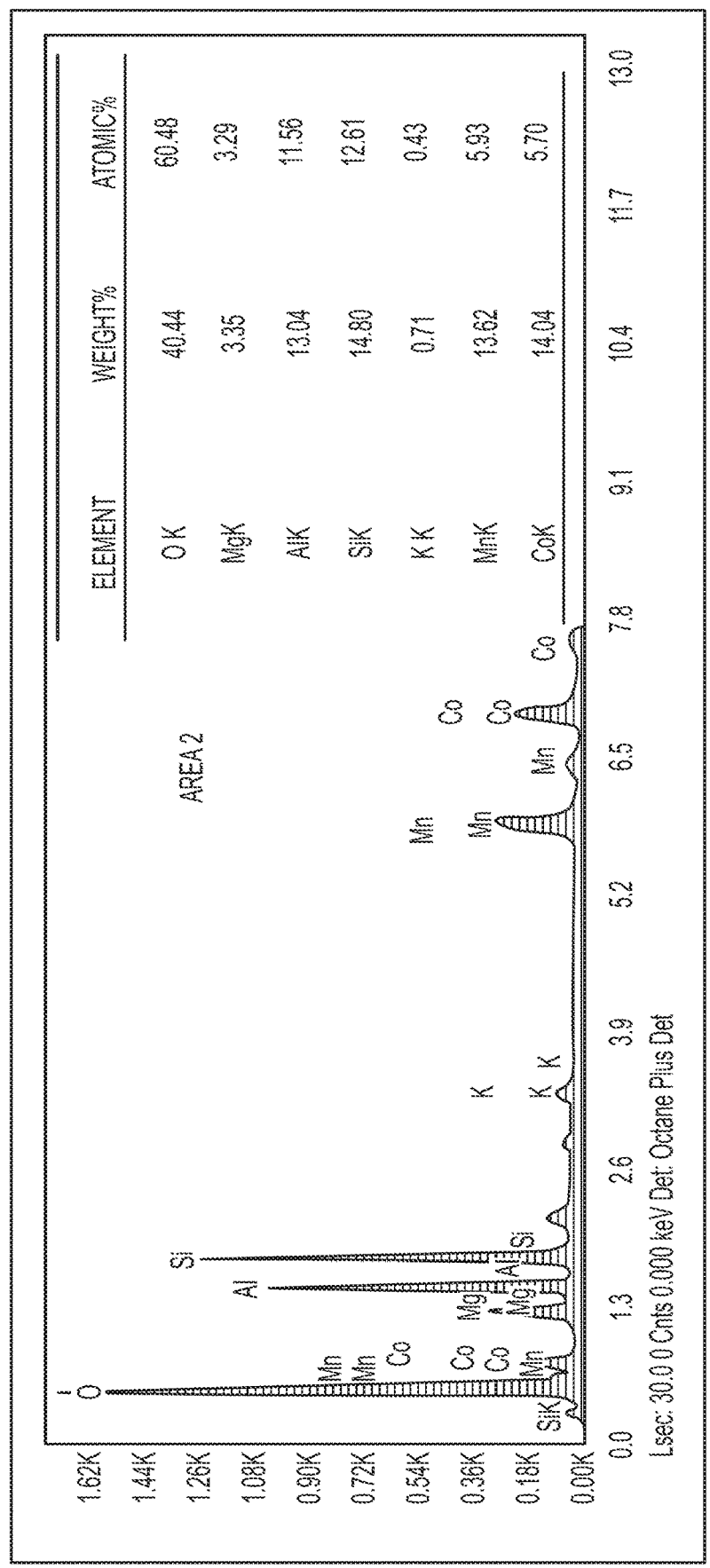
Figure 4D:
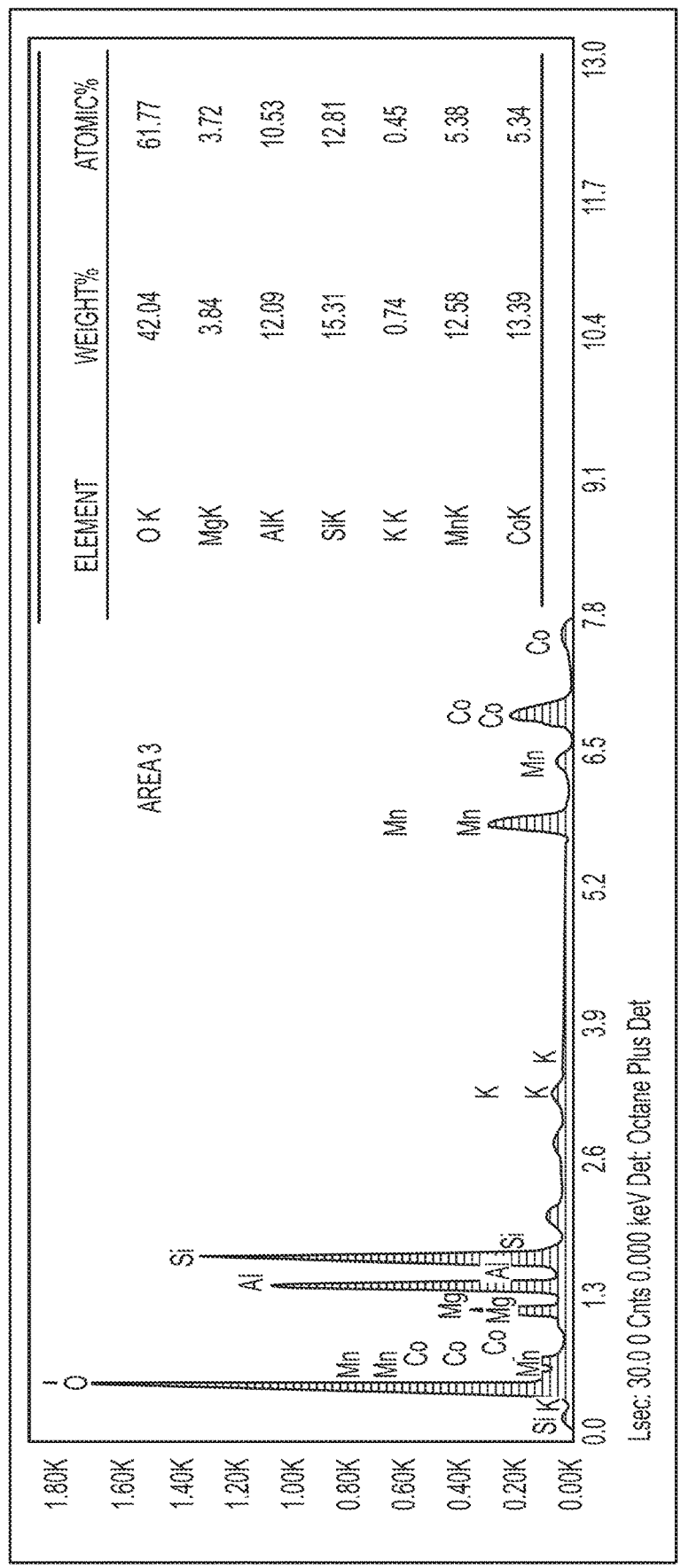

One of the as-synthesized samples (6Co-4Mn) was selected for further evaluation, as shown in FIGS. 3A-D. Low magnification SEM image (FIG. 3C) clearly demonstrates the nanoarray covered on the surface of substrate is highly uniform, confirming the reaction between $Co^{2+}$ and $MnO_4^-$ is a versatile way to construct highly uniform nano-structured Mn—Co spinel array. FIG. 3B shows a cross section of cordierite monolith and the nanoarray has a thickness of 1 μm with good adhesive property. FIG. 3D presents scanning electron microscopy with energy dispersive X-ray spectroscopy (SEM-EDX) for the selected area on a sample 6Co-4Mn. Besides the general composition of cordierite (Al, Si, Mg, O), the Mn, Co and K species were clearly observed on the nanoarray. Across different selected areas EDX spectra, the compositions revealed are similar, indicating the uniformity of nanoarray covered on the cordierite surface. The molar ratio of Co/Mn is about 1/1 which is also close to the ICP result (Co/Mn=0.972). A certain amount of K was found that may be assigned to the incorporation of K from $KMnO_4$ into Mn—Co composite oxide.

The nano-sheet like morphology was further illustrated by observation of transmission electron microscopy (TEM) images which are presented in FIGS. 5A-C and 5E. Interestingly, it can be seen that all the nano-sheets are inner-connected which can give a superior mechanical stability to the nanoarray when it suffers the flushing of gas flow. Also, the space formed among the nano-sheet array will be good for capture and diffusion of reactants[15, 19, 25-27]. Moreover, every single nano-sheet has a size of several hundred nanometers and a thickness of several nanometers, respectively. The high resolution TEM (HR-TEM) image (FIG. 5E) shows the novel polycrystalline properties and every nano-sheet contains large number of inner-connected nanocrystals with a size of several nanometers. Clearly, a typical inter-planar spacing observed at 0.25 nm can be ascribed to the preferentially exposed {311} facet of (Co, Mn)(Co, Mn)$_2$O$_4$(JCPDS 018-0410), which is similar to the other reports [28]. Furthermore, the TEM-EDS mapping analysis were performed to identify the element dispersion of composite oxide as shown in FIGS. 6A-F. The elemental mapping results show a uniform distribution of Co, Mn, O and K in each piece of Mn—Co composite nano-sheet, and all the related peaks can be found in the spectrum. The uniform elemental distribution shown here suggests that the Mn—Co composite oxide is uniformly synthesized by this approach.

X-Ray Diffraction

Figure 5A:
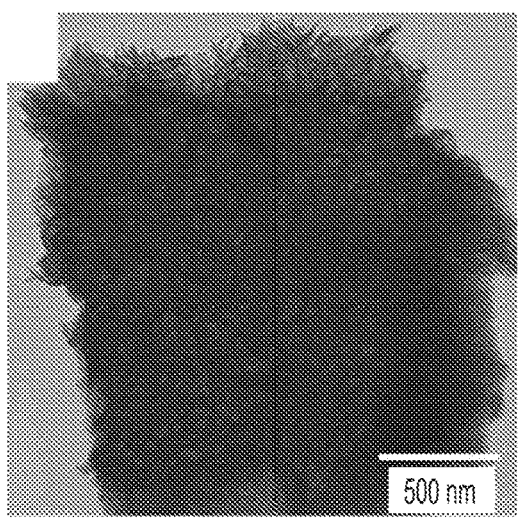
FIGS. 5A-C are TEM images of sample 6Co-4Mn.
Figure 5B:
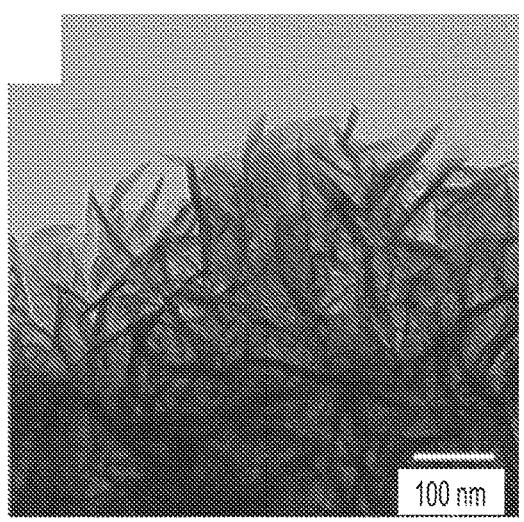
Figure 5C:
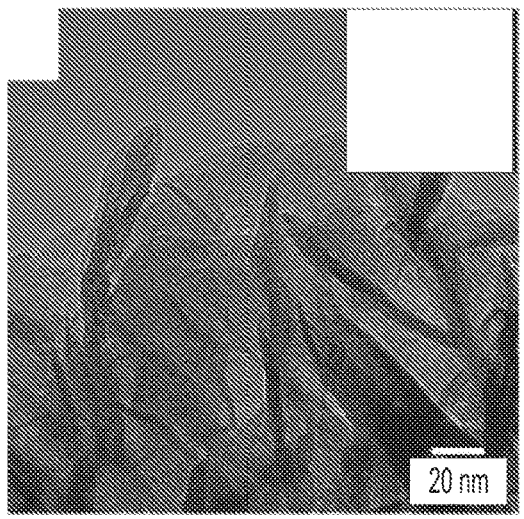
Figure 5D:
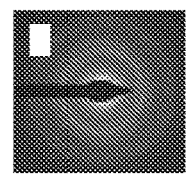
FIG. 5D is an SAED image of sample 6Co-4Mn.
Figure 5E:
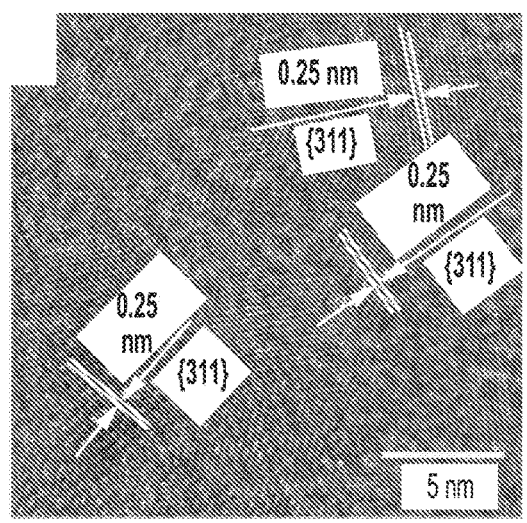
FIG. 5E is an HR-TEM images of sample 6Co-4Mn.
Figure 6F:
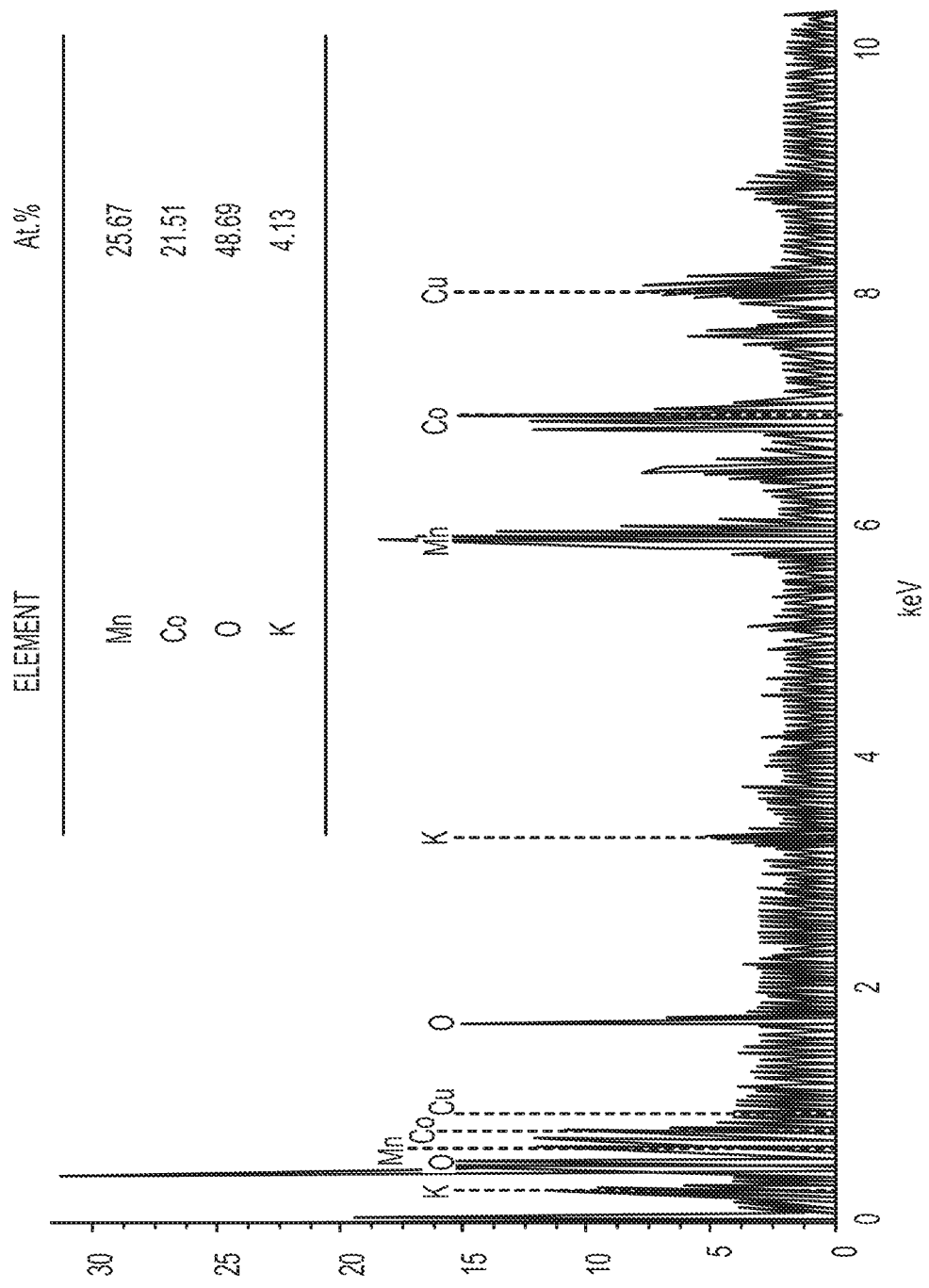
FIG. 6F is EDX-data of the Mn—Co—O nanoarray (sample 6Co-4Mn).

The XRD patterns of the as-prepared nano-sheet array based monolithic cordierite are represented in FIGS. 7A-B. The main diffractions of blank cordierite can be indexed to $Zn_2Al_4Si_5O_{18}$ (JCPDS 032-1456) and $Mg_2Al_4Si_5O_{18}$ (JCPDS 012-0303). Because the highly strong peaks of cordierite substrate, no clearly different peaks were observed on the monolith covered with Mn—Co composite oxide nano-sheet arrays. In order to understand more information of the as-prepared samples, the powders obtained from every reaction were collected for X-ray diffraction analysis and the results are shown in FIG. 7B. For samples achieved at low molar ratio of $Co^{2+}/MnO_4^-$ (0.5Co-4Mn and 1Co-4Mn), the weak peaks can be ascribed to $KMn_8O_{16}$ (JCPDS 029-1020). With increase of the Co/Mn precursor dosage, the peaks related to $KMn_8O_{16}$ disappeared. Even all the samples have been treated at high temperature (500° C.), only one main peak at about 37.5° can be observed which can be assigned to the {311} plane of (Co, Mn)(Co, Mn)$_2$O$_4$ (JCPDS 018-0410) spinel structure, which is consistent with the HR-TEM results (FIG. 5E).

$N_2$ Physisorption

FIG. 8A shows the nitrogen adsorption and desorption isotherms of nano-array based monoliths. A typical type IV characteristics can be observed on all samples with well-developed H1 type hysteresis loops, which are attributed to the capillary condensation in mesopores, indicating the existence of mesoporous structure of as-prepared nano-arrays[14, 29]. Table 1 presents the textural parameters of all as-prepared samples. The average pore diameters are from 4.5 nm to 9.6 nm. The results of the BET analysis in FIG. 8B demonstrate that the surface area of Mn—Co composite oxide nano-sheet arrays with substrate, for this particular example, can be as high as 35 $m^2 g^{-1}$. Considering the ultra-low surface area of cordierite honeycomb and loading ratio, the surface area of nano-arrays can be calculated by the equation $S_{nano-array}=S_{monolith}/W_{nano-array}$ (where the $S_{monolith}$ is the total surface area of nano-array on substrate, $W_{nano-array}$ is loading ration of nano-array on substrate). With this calculation, the BET surface area of pure nano-array can be as high as 175 $m^2 g^{-1}$ (35 $m^2 g^{-1}$/20%), offering more active sites for catalytic reaction.

$H_2$-TPR Analysis

Figure 9:
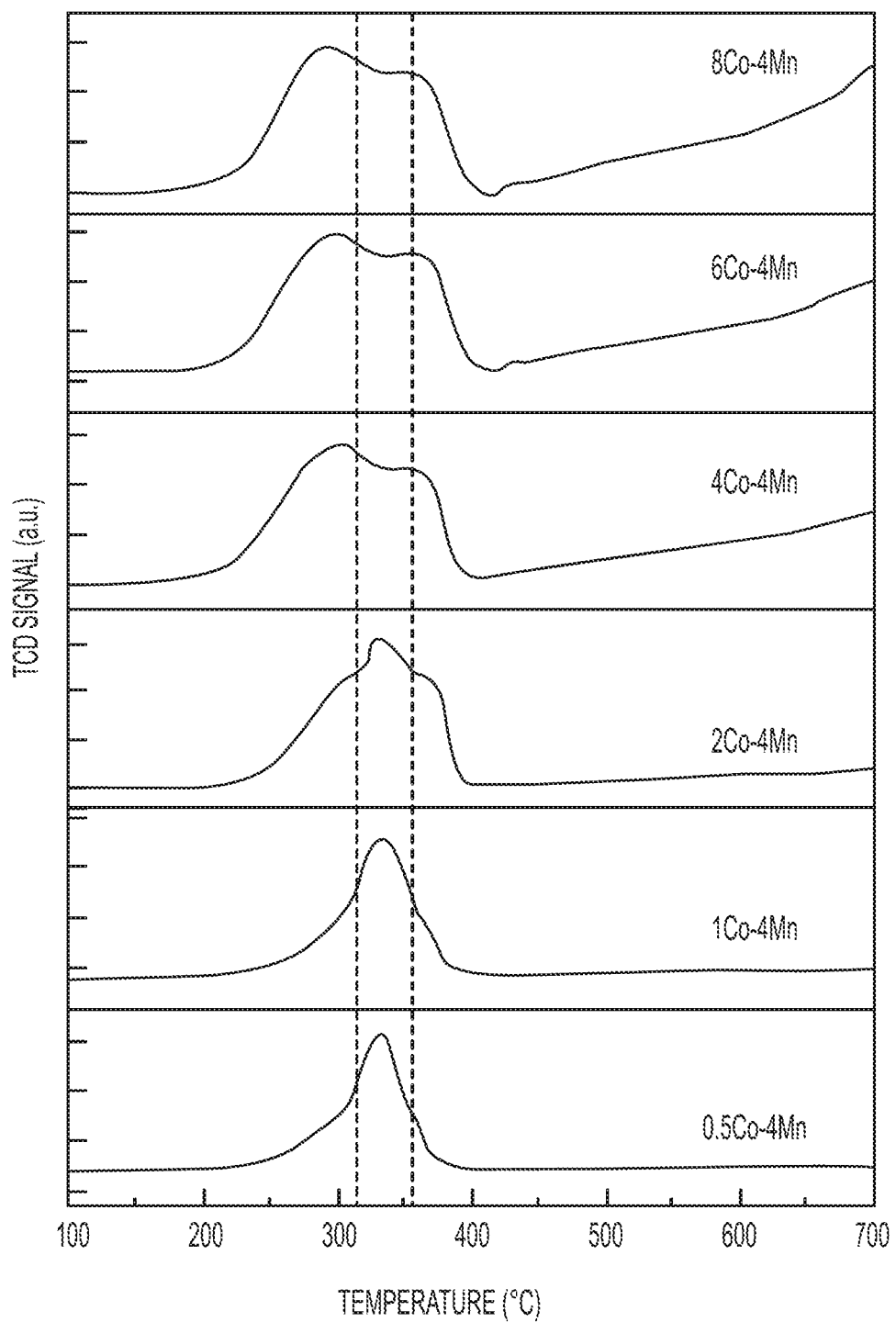
FIG. 9 is $H_2$-TPR profiles of the as-prepared Mn—Co-O nano-sheet array based monoliths.

A redox mechanism is usually applied to explain the catalytic oxidation reaction on the metal oxides, which contains oxidizing hydrocarbon by the surface (or lattice) oxygen of catalyst and regeneration of surface (or lattice) oxygen by gaseous oxygen [30, 31] The different oxidation states of Mn and Co species can provide serious redox pairs that will effectively promote the oxidation and reduction processes during the oxidation of hydrocarbons. $H_2$-TPR is an ideal method to investigate the reducibility of the catalysts and the results are displayed in FIG. 9. For single manganese oxide and cobalt oxide, the reduction processes include $MnO_x \rightarrow Mn_3O_4 \rightarrow MnO$ and $Co_3O_4 \rightarrow CoO \rightarrow Co$, where every further reduction step needs higher temperature[32-34]. As shown in FIG. 9, at a lower temperature (300-350° C.), reduction of $MnO_x$ to $Mn_3O_4$ and $CO_3O_4$ to CoO occurred. At a higher-temperature (>350° C.) reduction of $Mn_3O_4$ to MnO and CoO to Co occurred[13, 35, 36]. Moreover, the signals at lower temperature (<300) can be ascribed to the highly active oxygen species generated by the strong synergistic effect in Mn—Co spinel oxides, which is similar to other reports[32, 35-37]. Moreover, it can be seen that the low-temperature reducibility is promoted by increasing the molar ratio of reactants, indicating more incorporation of Co is beneficial for generating more active oxygen species.

Catalytic Combustion of Propane

Figure 10A:
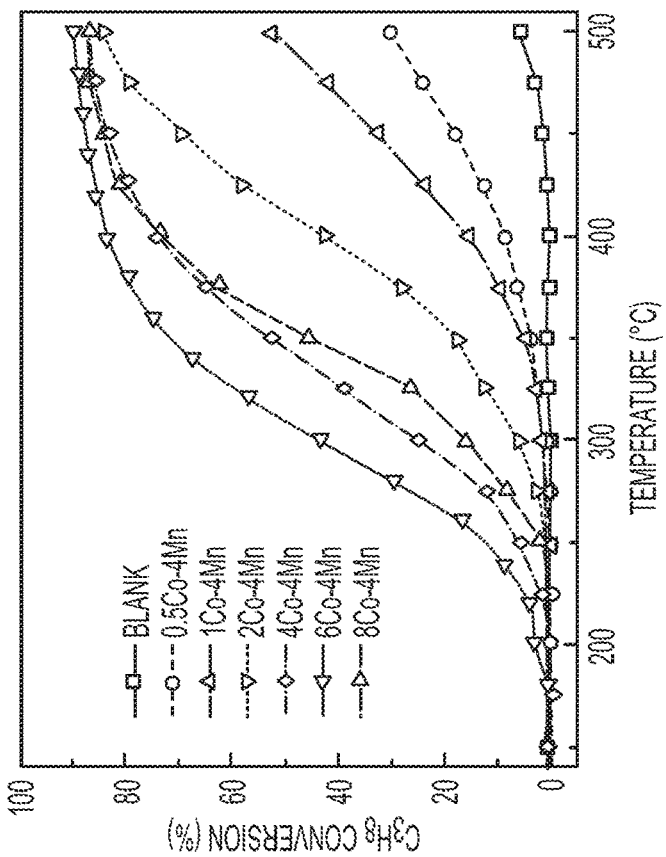
FIG. 10A is a graph of catalytic propane oxidation performance of the as-prepared Mn—Co—O nanoarrays based monoliths.
Figure 10B:
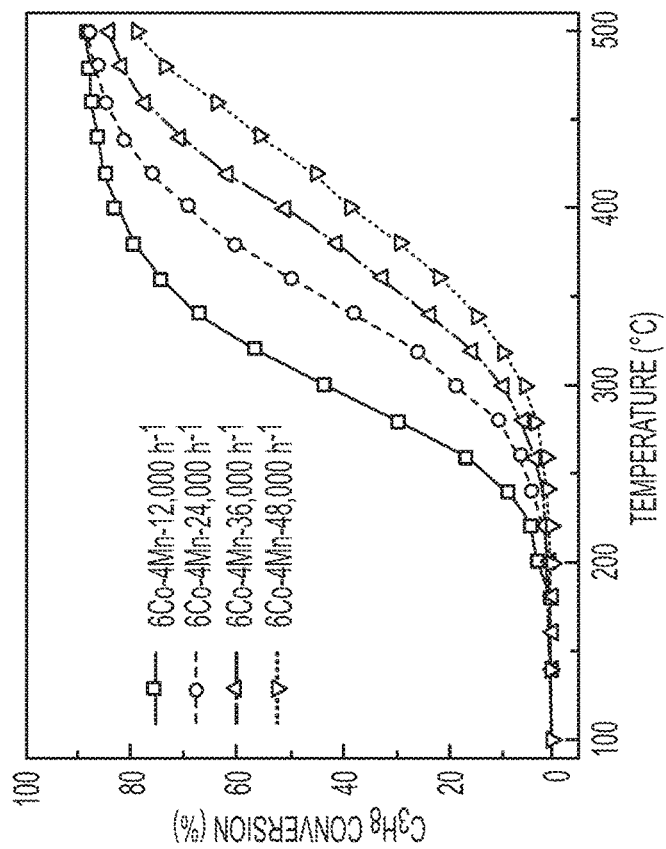
FIG. 10B is a graph of catalytic propane oxidation performance over the sample 6Co-4Mn at different space velocity.
Figure 10D:
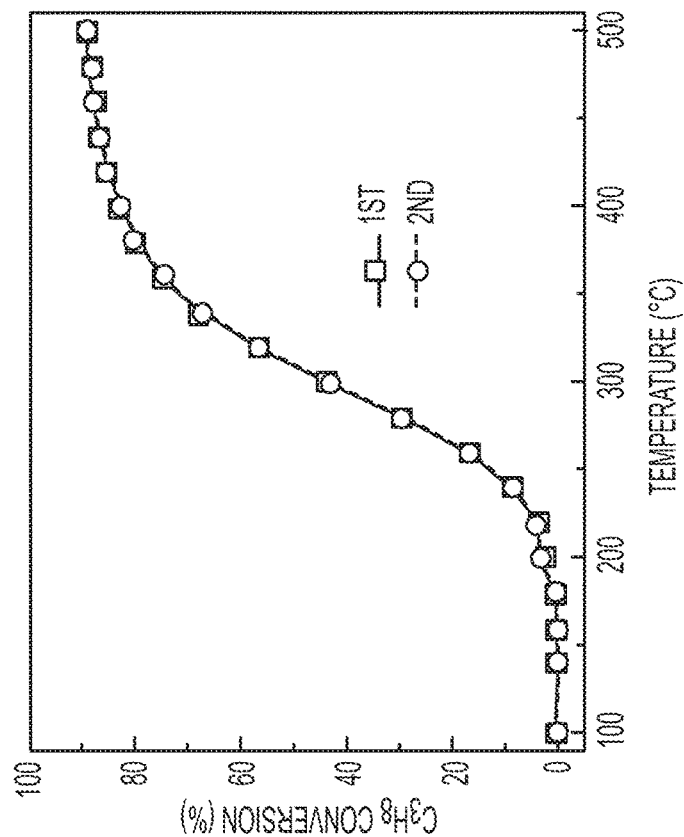
FIG. 10D is a graph of catalytic propane oxidation performance of the sample 6Co-4Mn over $1^{st}$ and $2^{nd}$ runs.
Figure 10C:
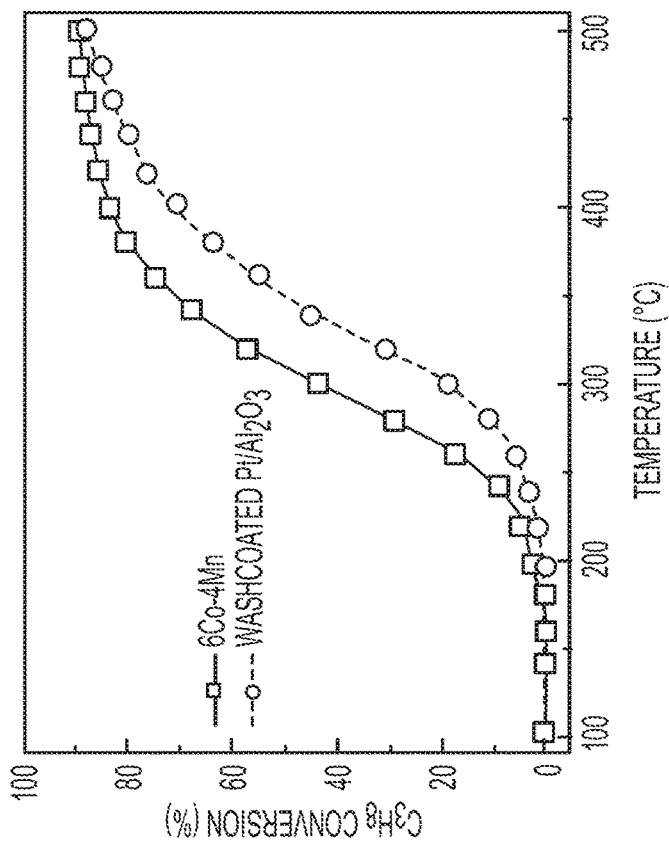
FIG. 10C is a graph of comparison of catalytic activities between the sample 6Co-4Mn and wash-coated Pt/$Al_2O_3$.

FIG. 10A presents the catalytic conversion of propane as a function of reaction temperature. The thermal decomposition of gaseous propane at low concentration is difficult and little conversion of propane was observed below 500° C. when only blank cordierite was loaded in the reactor. With the in-situ grown Mn—Co composite oxides into the cordierite honeycomb channels, the conversion of propane can take place at lower temperature. With increase of the molar ratio of reactants, the catalytic performance is significantly promoted. For an example, the temperature for 50% conversion of $C_3H_8$ into $CO_2$ over catalyst 1Co-4Mn can be achieved at 495° C. while the same conversion over sample 4Co-4Mn is lowered to 345° C. From the sample 0.5Co-4Mn to 4Co-4Mn, the promoted catalytic activities can be attributed to the increased loading ratio of Mn—Co composite oxide nano-sheet arrays. Compared to the samples with similar loading ratio (4Co-4Mn, 6Co-4Mn and 8Co-4Mn), catalyst 6Co-4Mn exhibits the best catalytic propane oxidation activity with 50% conversion temperature at 310° C. FIG. 10B shows the catalytic activity of 6Co-4Mn at different space velocity (SV). With increase of the SV, the propane conversion decreased significantly, indicating a longer contact time is beneficial for improving the catalytic performance. It is noteworthy that under similar reaction conditions over wash-coated catalyst with commercial 1% Pt/$Al_2O_3$, the temperature for 50% conversion of $C_3H_8$ into $CO_2$ is about 370° C. as shown in FIG. 10C, which is 60° C. higher than that over the array based catalyst. The better performance in the Mn—Co composite oxide nano-sheet array based catalyst can be due to the good redox properties of Mn—Co spinel oxide and effective diffusion condition of array nanostructures. Moreover, the performance can be repeated perfectly over used catalyst as shown in FIG. 10D, indicating the good stability of the synthesized Mn—Co array catalyst.

Conclusions

In summary, the reaction between $Co^{2+}$ and Mnac at about 90° C. can be used to integrate Mn—Co composite oxide nano-sheet array onto a 3D cordierite honeycomb substrate. The $Co^{2+}$ can reduce $MnO_4^-$ to grow Mn—Co spinel oxide nano-sheet arrays uniformly on the channel surface of cordierite honeycomb. The novel nanostructure shows good low temperature catalytic activity for propane oxidation, with the 50% conversion temperature achieved at 310° C. which was much lower than that over the wash-coated commercial Pt/$Al_2O_3$. These integrated functional Mn—Co composite oxide nano-arrays are useful for the conversion of gaseous hydrocarbons to carbon dioxide.

References

[1] D. Li, J. Yang, W. Tang, X. Wu, L. Wei, Y. Chen, Controlled synthesis of hierarchical MnO 2 microspheres with hollow interiors for the removal of benzene, RSC Advances 4 (2014) 26796-26803.

[2] T.-D. Dang, A. N. Banerjee, S. W. Joo, B.-K. Min, Effect of potassium ions on the formation of crystalline manganese oxide nanorods via acidic reduction of potassium permanganate, Industrial & Engineering Chemistry Research 52 (2013) 14154-14159.

[3] J. Yuan, K. Laubernds, Q. Zhang, S. L. Suib, Self-assembly of microporous manganese oxide octahedral molecular sieve hexagonal flakes into mesoporous hollow nanospheres, Journal of the American Chemical Society 125 (2003) 4966-4967.

[4] A. M. El-Sawy, C. K. King'ondu, C.-H. Kuo, D. A. Kriz, C. J. Guild, Y. Meng, S. J. Frueh, S. Dharmarathna, S. N. Ehrlich, S. L. Suib, X-ray Absorption Spectroscopic Study of a Highly Thermally Stable Manganese Oxide Octahedral Molecular Sieve (OMS-2) with High Oxygen Reduction Reaction Activity, Chemistry of Materials 26 (2014) 5752-5760.

[5] Y. Shen, R. Zerger, R. DeGuzman, S. Suib, L. McCurdy, D. Potter, C. O'young, Manganese oxide octahedral molecular sieves: preparation, characterization, and applications, Science 260 (1993) 511-515.

[6] W. N. Li, J. Yuan, X. F. Shen, S. Gomez-Mower, L. P. Xu, S. Sithambaram, M. Aindow, S. L. Suib, Hydrothermal Synthesis of Structure-and Shape-Controlled Manganese Oxide Octahedral Molecular Sieve Nanomaterials, Advanced Functional Materials 16 (2006) 1247-1253.

[7] M. Polverejan, J. C. Villegas, S. L. Suib, Higher valency ion substitution into the manganese oxide framework, Journal of the American Chemical Society 126 (2004) 7774-7775.

[8] Y.-s. Ding, X.-f Shen, S. Sithambaram, S. Gomez, R. Kumar, V. M. B. Crisostomo, S. L. Suib, M. Aindow, Synthesis and catalytic activity of cryptomelane-type manganese dioxide nanomaterials produced by a novel solvent-free method, Chemistry of Materials 17 (2005) 5382-5389.

[9] D. Kong, J. Luo, Y. Wang, W. Ren, T. Yu, Y. Luo, Y. Yang, C. Cheng, Three-Dimensional $Co_3O_4$@ $MnO_2$ Hierarchical Nanoneedle Arrays: Morphology Control and Electrochemical Energy Storage, Advanced Functional Materials 24 (2014) 3815-3826.

[10] S. Luo, L. Duan, B. Sun, M. Wei, X. Li, A. Xu, Manganese oxide octahedral molecular sieve (OMS-2) as an effective catalyst for degradation of organic dyes in aqueous solutions in the presence of peroxymonosulfate, Applied Catalysis B: Environmental 164 (2015) 92-99.

[11] S. Ching, D. A. Kriz, K. M. Luthy, E. C. Njagi, S. L. Suib, Self-assembly of manganese oxide nanoparticles and hollow spheres. Catalytic activity in carbon monoxide oxidation, Chemical Communications 47 (2011) 8286-8288.

[12] A. Zhao, J. Masa, W. Xia, A. Maljusch, M.-G. Willinger, G. Clavel, K. Xie, R. Schlogl, W. Schuhmann, M. Muhler, Spinel MnCo oxide in N-doped carbon nanotubes as a bifunctional electrocatalyst synthesized by oxidative cutting, Journal of the American Chemical Society 136 (2014) 7551-7554.

[13] W. Tang, X. Wu, S. Li, W. Li, Y. Chen, Porous MnCo mixed oxide nanorod as a novel catalyst with enhanced catalytic activity for removal of VOCs, Catalysis Communications 56 (2014) 134-138.

[14] L. Yu, L. Zhang, H. B. Wu, G. Zhang, X. W. D. Lou, Controlled synthesis of hierarchical $Co_x Mn_{3-x}O_4$ array micro-/nanostructures with tunable morphology and composition as integrated electrodes for lithium-ion batteries, Energy & Environmental Science 6 (2013) 2664-2671.

[15] Y. Guo, Z. Ren, W. Xiao, C. Liu, H. Sharma, H. Gao, A. Mhadeshwar, P.-X. Gao, Robust 3-D configured metal oxide nano-array based monolithic catalysts with ultrahigh materials usage efficiency and catalytic performance tunability, Nano Energy 2 (2013) 873-881.

[16] Y. Guo, G. Liu, Z. Ren, A. Piyadasa, P.-X. Gao, Single crystalline brookite titanium dioxide nanorod arrays rooted on ceramic monoliths: a hybrid nanocatalyst support with ultra-high surface area and thermal stability, CrystEngComm 15 (2013) 8345-8352.

[17] W. Xiao, Y. Guo, Z. Ren, G. Wrobel, Z. Ren, T. Lu, P.-X. Gao, Mechanical-Agitation-Assisted Growth of Large-Scale and Uniform ZnO Nanorod Arrays within 3D Multichannel Monolithic Substrates, Crystal Growth & Design 13 (2013) 3657-3664.

[18] Y. Guo, Z. Zhang, Z. Ren, H. Gao, P.-X. Gao, Synthesis, characterization and CO oxidation of TiO 2/(La, Sr) MnO 3 composite nanorod array, Catalysis Today 184 (2012) 178-183.

[19] Z. Ren, V. Botu, S. Wang, Y. Meng, W. Song, Y. Guo, R. Ramprasad, S. L. Suib, P. X. Gao, Monolithically Integrated Spinel MxCo3-xO4 (M=Co, Ni, Zn) Nanoarray Catalysts: Scalable Synthesis and Cation Manipulation for Tunable Low-Temperature CH4 and CO Oxidation, Angewandte Chemie International Edition 53 (2014) 7223-7227.

[20] S. Wang, Z. Ren, W. Song, Y. Guo, M. Zhang, S. L. Suib, P.-X. Gao, ZnO/perovskite coreshell nanorod array based monolithic catalysts with enhanced propane oxidation and material utilization efficiency at low temperature, Catalysis Today 258 (2015) 549-555.

[21] Z. Ren, Z. Wu, W. Song, W. Xiao, Y. Guo, J. Ding, S. L. Suib, P.-X. Gao, Low temperature propane oxidation over Co 3 O 4 based nano-array catalysts: Ni dopant effect, reaction mechanism and structural stability, Applied Catalysis B: Environmental 180 (2016) 150-160.

[22] S. Y. Chen, W. Song, H. J. Lin, S. Wang, S. Biswas, M. Mollahosseini, C. H. Kuo, P. X. Gao, S. L. Suib, Manganese Oxide Nanoarray-Based Monolithic Catalysts: Tunable Morphology and High Efficiency for CO Oxidation, ACS Appl Mater Interfaces 8 7834-7842.

[23] S.-Y. Chen, W. Song, H.-J. Lin, S. Wang, S. Biswas, M. Mollahosseini, C.-H. Kuo, P.-X. Gao, S. L. Suib, Manganese Oxide Nanoarray-Based Monolithic Catalysts: Tunable Morphology and High Efficiency for CO Oxidation, ACS Appl Mater Interfaces 8 (2016) 7834-7842.

[24] J. Liu, J. Jiang, C. Cheng, H. Li, J. Zhang, H. Gong, H. J. Fan, $Co_3O_4$ Nanowire@$MnO_2$ Ultrathin Nanosheet Core/Shell Arrays: A New Class of High-Performance Pseudocapacitive Materials, Advanced Materials 23 (2011) 2076-2081.

[25] Z. Ren, Z. Wu, W. Song, W. Xiao, Y. Guo, J. Ding, S. L. Suib, P.-X. Gao, Low temperature propane oxidation over Co3O4 based nano-array catalysts: Ni dopant effect, reaction mechanism and structural stability, Applied Catalysis B: Environmental 180 (2016) 150-160.

[26] Z. Ren, Y. Guo, Z. Zhang, C. Liu, P.-X. Gao, Nonprecious catalytic honeycombs structured with three dimensional hierarchical Co 3 O 4 nano-arrays for high performance nitric oxide oxidation, Journal of Materials Chemistry A 1 (2013) 9897-9906.

[27] Z. Ren, Y. Guo, P.-X. Gao, Nano-array based monolithic catalysts: Concept, rational materials design and tunable catalytic performance, Catalysis Today 258 (2015) 441-453

[28] Y. Liang, H. Wang, J. Zhou, Y. Li, J. Wang, T. Regier, H. Dai, Covalent hybrid of spinel manganese-cobalt oxide and graphene as advanced oxygen reduction electrocatalysts, Journal of the American Chemical Society 134 (2012) 3517-3523.

[29] Y. Huang, W. Fan, B. Long, H. Li, W. Qiu, F. Zhao, Y. Tong, H. Ji, Alkali-Modified Non-Precious Metal 3D-NiCo2O4 Nanosheets for Efficient Formaldehyde Oxidation at Low Temperature, Journal of Materials Chemistry A (2016).

[30] J. J. Spivey, Complete catalytic oxidation of volatile organics, Industrial & Engineering Chemistry Research 26 (1987) 2165-2180.

[31] W. Li, J. Wang, H. Gong, Catalytic combustion of VOCs on non-noble metal catalysts, Catalysis Today 148 (2009) 81-87.

[32] S. Todorova, H. Kolev, J. Holgado, G. Kadinov, C. Bonev, R. Pereniguez, A. Caballero, Complete n-hexane oxidation over supported MnCo catalysts, Applied Catalysis B: Environmental 94 (2010) 46-54.

[33] W. Tang, X. Wu, D. Li, Z. Wang, G. Liu, H. Liu, Y. Chen, Oxalate route for promoting activity of manganese oxide catalysts in total VOCs' oxidation: effect of calcination temperature and preparation method, Journal of Materials Chemistry A 2 (2014) 2544.

[34] Z. Zhu, G. Lu, Z. Zhang, Y. Guo, Y. Guo, Y. Wang, Highly active and stable Co3O4/ZSM-5 catalyst for propane oxidation: effect of the preparation method, ACS Catalysis 3 (2013) 1154-1164.

[35] W. Tang, W. Li, D. Li, G. Liu, X. Wu, Y. Chen, Synergistic Effects in Porous MnCo Mixed Oxide Nanorods Enhance Catalytic Deep Oxidation of Benzene, Catalysis Letters 144 (2014) 1900-1910.

[36] M. H. Castalio, R. Molina, S. Moreno, Cooperative effect of the CoMn mixed oxides for the catalytic oxidation of VOCs: Influence of the synthesis method, Applied Catalysis A: General 492 (2015) 48-59.

[37] Z.-Y. Tian, P. H. T. Ngamou, V. Vannier, K. Kohse-Hoinghaus, N. Bahlawane, Catalytic oxidation of VOCs over mixed CoMn oxides, Applied Catalysis B: Environmental 117 (2012) 125-134.

[38] U.S. Pat. No. 5,182,249

[39] U.S. Published Patent Application No. 2014/0256534

Example #2

Materials and Methods

A nanostructured $Mn_xCo_{3-x}O_4$ sheet array was synthesized by a hydrothermal reaction between $KMnO_4$ and $Co(NO_3)_2$ solution. Reaction time: 12 hours; Temperature: 95° C.; Ratio 6Mn-4Co. Two kinds of cordierite honeycomb (600 cpsi) including blank one and another treated with basic solution were used as substrates for in-situ growth of nano-array based catalysts. The catalytic hydrocarbons combustion was conducted in a fixed-bed reactor by using the BenchCAT system with a space velocity of 24,000 $h^{-1}$. The typical reaction gas was 0.5% $C_3H_6$ (or 0.3% $C_3H_8$)+10% $O_2$ balanced with nitrogen.

Results and Discussion

Figure 11B:
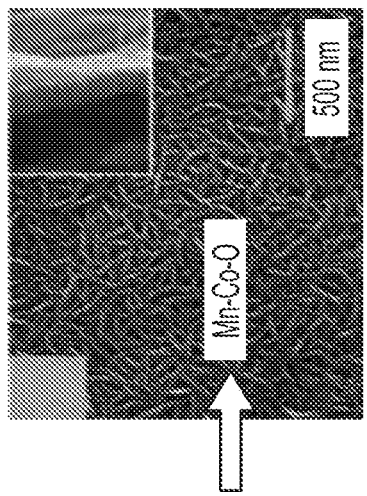
FIG. 11B is a top view and cross section (inset) of Mn—Co-O nanoarray on blank cordierite.
Figure 11D:
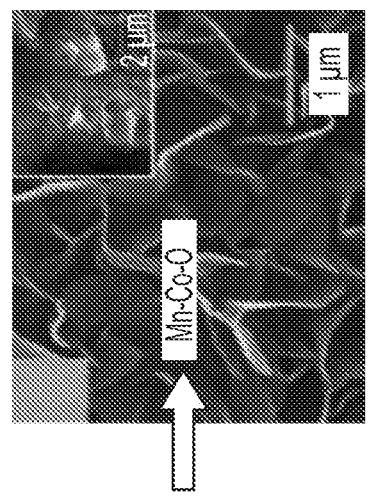
FIG. 11D is a top view and cross section (inset) of Mn—Co—O nanoarray on etched cordierite.
Figure 11A:
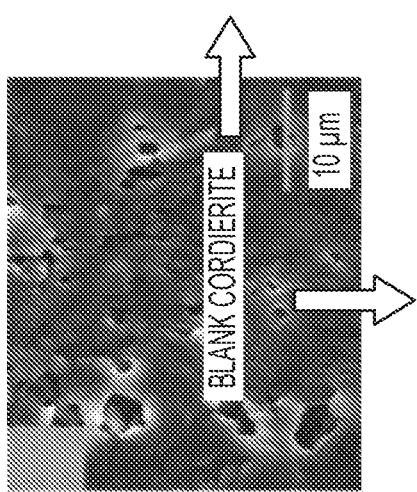
FIG. 11A is an image of a blank cordierite surface.
Figure 11C:
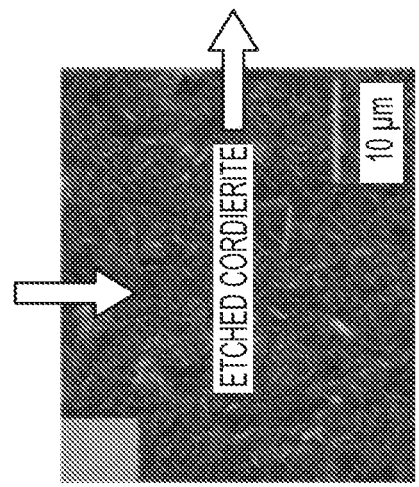
FIG. 11C is an image of an etched cordierite surface.
Figure 11F:
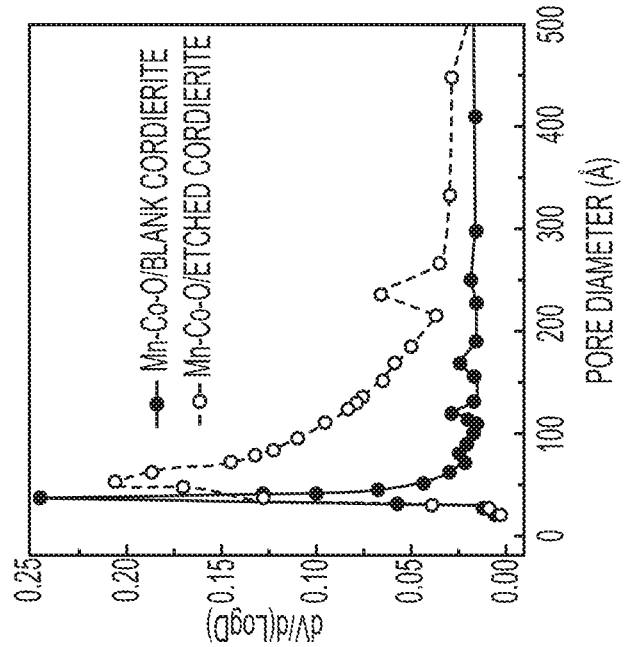
FIG. 11F is a graphs showing pore-size distribution of Mn—Co—O nanoarray based monolith.
Figure 11E:
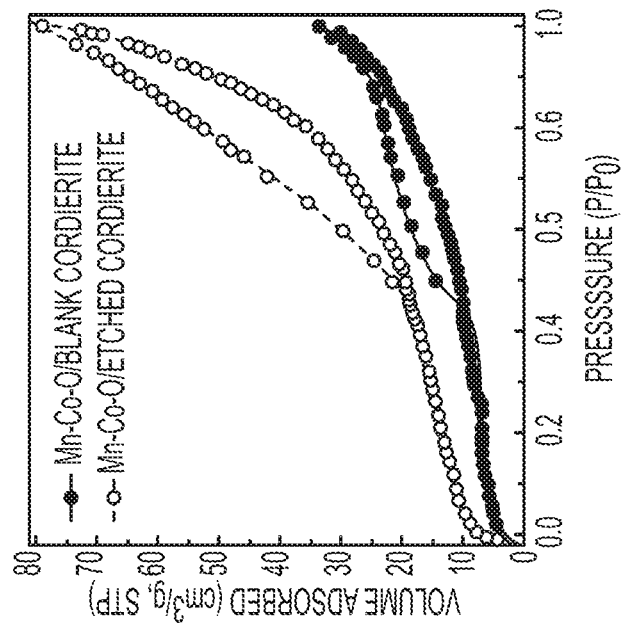
FIG. 11E is a graph showing $N_2$ adsorption-desorption isotherms of Mn—Co—O nanoarray based monolith.
Figure 11H:
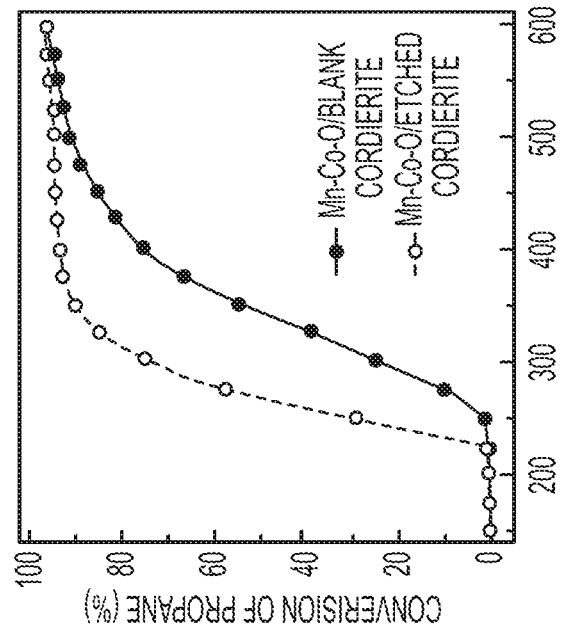
FIGS. 11G and 11H are graphs showing catalytic propylene (FIG. 11G) and propane (FIG. 11H) oxidation performance of Mn—Co—O nanoarray based monolith.
Figure 11G:
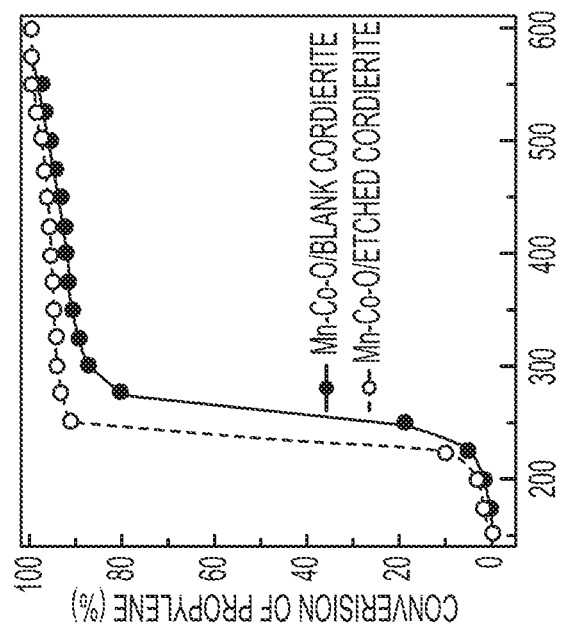

Compared to the blank cordierite honeycomb (FIG. 11A), a uniform nano-sheet array (FIG. 11C) was etched out after the basic solution treatment, which made the surface rougher. By using the blank and etched cordierite as a growing substrate, highly uniform $Mn_xCo_{3-x}O_4$ nano-array (MnCo-1) assembled by numerous nano-sheets could be successfully introduced on the substrate surface with good adhesion property. The nano-sheets grown on the etched cordierite (MnCo-2) show bigger size and lower density compared to nano-sheets grown on cordierite that is not etched, and the thickness (3 μm) is much greater than that (500 nm) on the blank cordierite as shown in the inset images. The BET analysis in FIGS. 11E and 11F reveals more porous structure displayed (high surface area and wide pore distribution) on the MnCo-2 that may lead to a better catalytic performance due to the higher concentration of active sites and better mass transfer environment. As displayed in FIGS. 11G and 11H, the complete propylene and propane conversion over MnCo-2 can be observed at temperature as low as 275 and 350° C., which is 50 and 125° C. lower than that of MnCo-1. More analysis has been carried out to investigate the relationship among textural properties, mass transfer, surface chemistry and reaction activities.

Significance

A reaction between $KMnO_4$ and $Co(NO)_2$ has been used to synthesize Mn—Co spinel oxide and successfully applied to in-situ grow $Mn_xCo_{3-x}O_4$ sheet array on the 3-D channel of commercial cordierite honeycomb. The textural properties can be controlled by modifying the surface of cordierite substrate. By adjusting the porosity of $Mn_xCo_{3-x}O_4$ sheet array, the catalytic activities toward hydrocarbons combustion can be significantly promoted.

INCORPORATION BY REFERENCE; EQUIVALENTS

The teachings of all patents, published applications and references cited herein are incorporated by reference in their entirety.

While the invention has been described with reference to preferred embodiments, it will be understood by those skilled in the art that various changes may be made and equivalents may be substituted for the elements thereof without departing from the scope of the invention. In addition, many modifications may be made to adapt the teaching of the invention to particular use, application, manufacturing conditions, use conditions, composition, medium, size, and/or materials without departing from the essential scope and spirit of the invention. Therefore, it is intended that the invention not be limited to the particular embodiments and best mode contemplated for carrying out this invention as described herein.

While various aspects and embodiments have been disclosed herein, other aspects and embodiments will be apparent to those skilled in the art. The various aspects and embodiments disclosed herein are for purposes of illustration and are not intended to be limiting of the true scope of the invention disclosed herein. It is also to be understood that the terminology used herein is for the purpose of describing particular embodiments only, and is not intended to be limiting. Since many modifications, variations, and changes in detail can be made to the described examples, it is intended that all matters in the preceding description and shown in the accompanying figures be interpreted as illustrative and not in a limiting sense.

Chemical compounds are described using standard nomenclature. For example, any position not substituted by any indicated group is understood to have its valency filled by a bond as indicated, or a by hydrogen atom.

All ranges disclosed herein are inclusive of the endpoints, and the endpoints are independently combinable with each other. Each range disclosed herein constitutes a disclosure of any point or sub-range lying within the disclosed range.

The use of the terms "a" and "an" and "the" and words of a similar nature in the context of describing the improvements disclosed herein (especially in the context of the following claims) are to be construed to cover both the singular and the plural, unless otherwise indicated herein or clearly contradicted by context. Further, it should further be noted that the terms "first," "second," and the like herein do not denote any order, quantity, or relative importance, but rather are used to distinguish one element from another. The modifier "about" used in connection with a quantity is inclusive of the stated value and has the meaning dictated by the context (e.g., it includes, at a minimum the degree of error associated with measurement of the particular quantity).

All methods described herein can be performed in any suitable order unless otherwise indicated herein or otherwise clearly contradicted by context. The use of any and all examples, or exemplary language (e.g., "such as"), is intended merely to better illustrate the invention and does not pose a limitation on the scope of the invention or any embodiments unless otherwise claimed.

What is claimed is:

1. A method of making a manganese-cobalt (Mn-Co) spinel oxide nanoarray on a 3-D channeled honeycomb substrate, comprising:
   contacting the 3-D channeled honeycomb substrate with a solvent consisting essentially of a source of $MnO_4^-$ and $Co^{2+}$ ions at a temperature from about 60° C. to about 120° C., wherein the $MnO_4^-$ and $Co^{2+}$ ions react in a redox reaction to directly form the manganese-cobalt (Mn-Co) spinel oxide nanoarray on the 3-D channeled honeycomb substrate.

2. The method of claim 1, wherein the source of $MnO_4^-$ ions is potassium permanganate ($KMnO_4$).

3. The method of claim 1, wherein the source of $Co^{2+}$ ions is cobalt nitrate.

4. The method of claim 3, wherein the cobalt nitrate is cobalt nitrate hexahydrate ($Co(NO_3)_2 \cdot 6H_2O$).

5. The method of claim 1, wherein the solvent is water.

6. The method of claim 1, further comprising varying the concentration of $MnO_4^-$ or $Co^{2+}$ ions in the solvent to control deposition rate of the manganese-cobalt spinel oxide nanoarray.

7. The method of claim 1, further comprising controlling the temperature of the solvent to control deposition rate of the manganese-cobalt spinel oxide nanoarray.

8. The method of claim 1, wherein the 3-D channeled honeycomb substrate is a cordierite.

9. The method of claim 1, wherein the contacting step is repeated at least once to increase the thickness of the manganese-cobalt spinel oxide nanoarray.

* * * * *